(12) United States Patent
Yamamoto et al.

(10) Patent No.: US 11,415,774 B2
(45) Date of Patent: Aug. 16, 2022

(54) COMPACT IMAGE CAPTURING APPARATUS HAVING A PLURALITY OF EXTERNAL CONNECTIONS AND COOLING SYSTEM

(71) Applicant: CANON KABUSHIKI KAISHA, Tokyo (JP)

(72) Inventors: Kazuo Yamamoto, Tokyo (JP); Yasuhiro Kojima, Inagi (JP); Yuko Teruya, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 135 days.

(21) Appl. No.: 16/934,085

(22) Filed: Jul. 21, 2020

(65) Prior Publication Data
US 2021/0055512 A1 Feb. 25, 2021

(30) Foreign Application Priority Data
Aug. 20, 2019 (JP) .............................. JP2019-150315

(51) Int. Cl.
G02B 13/00 (2006.01)
G03B 17/56 (2021.01)
H04N 5/225 (2006.01)

(52) U.S. Cl.
CPC ....... *G02B 13/0015* (2013.01); *G03B 17/566* (2013.01); *H04N 5/2252* (2013.01)

(58) Field of Classification Search
CPC .. G02B 13/0015; G03B 17/566; G03B 17/02; G03B 17/55; H04N 5/22521; H04N 5/2252
See application file for complete search history.

(56) References Cited

U.S. PATENT DOCUMENTS

| | | | | |
|---|---|---|---|---|
| 9,838,558 | B2* | 12/2017 | Petty | G06F 1/20 |
| 11,190,671 | B2* | 11/2021 | Wada | H05K 7/20154 |
| 2009/0002549 | A1* | 1/2009 | Kobayashi | H04N 5/22521 348/374 |
| 2009/0244363 | A1* | 10/2009 | Sugimura | H04N 5/225251 348/E5.025 |
| 2016/0301819 | A1* | 10/2016 | Petty | H04N 5/22521 |

FOREIGN PATENT DOCUMENTS

JP 2016134814 A 7/2016

* cited by examiner

*Primary Examiner* — Hung H Lam
(74) *Attorney, Agent, or Firm* — Rossi, Kimms & McDowell LLP

(57) ABSTRACT

An image capturing apparatus that is made compact in the size of an apparatus body, particularly the lateral size thereof, without impairing operability thereof. The image capturing apparatus includes connection terminals for connecting external devices thereto, an air inlet port via which air is drawn in for cooling heat sources of an apparatus body, and an air outlet port via which the air is discharged. A connection terminal arrangement surface and an air outlet port arrangement surface form different surfaces and are inclined at predetermined angles with respect to an optical axis, respectively. The connection terminal arrangement surface and the air outlet port arrangement surface are arranged to be displaced in a left-right direction, as viewed from the side of the image capturing apparatus, and are arranged to overlap each other, as viewed from the front of the image capturing apparatus.

14 Claims, 20 Drawing Sheets

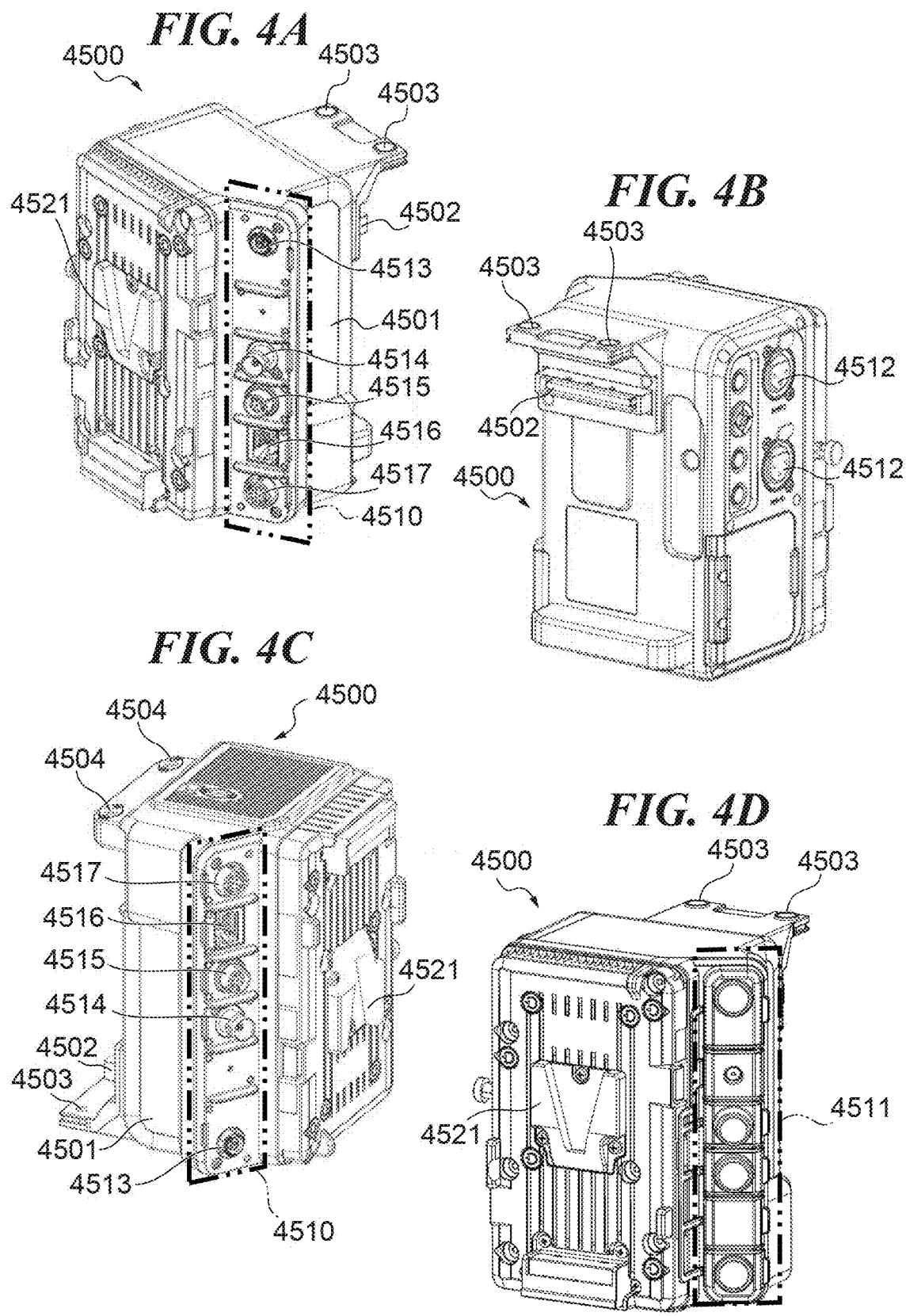

COMPACT IMAGE CAPTURING APPARATUS HAVING A PLURALITY OF EXTERNAL CONNECTIONS AND COOLING SYSTEM

BACKGROUND OF THE INVENTION

Field of the Invention

The present invention relates to an image capturing apparatus, such as a digital video camera for professional use, and more particularly to an image capturing apparatus equipped with a plurality of external input/output terminals.

Description of the Related Art

Digital video cameras for professional use are used for shooting in a state connected to a plurality of external devices, such as an external monitor and an external recorder, via cables and the like. Therefore, each digital video camera includes a plurality of external input/output terminals for connection to the external devices. Further, it is desired that the digital video camera for professional use is excellent in maneuverability at shooting sites and also compact in size.

As the above-described digital video camera, there has been proposed, for example, an image capturing apparatus which includes a plurality of input/output terminals, a cooling fan, an air inlet port, a duct, and an air outlet port, and in which the plurality of input/output terminals are arranged adjacent to the air outlet port (see e.g. Japanese Laid-Open Patent Publication (Kokai) No. 2016-134814).

In the above-mentioned conventional technique, however, sufficient measures are not taken from the viewpoint of reducing the size of the image capturing apparatus itself, particularly a size in a width direction thereof, and hence there is a demand for developing an image capturing apparatus that is made compact in the size in the width direction.

In other words, in an image capturing apparatus, such as the image capturing apparatus disclosed in Japanese Laid-Open Patent Publication (Kokai) No. 2016-134814, in which a plurality of external input/output terminals and an air outlet port are arranged adjacent to each other, there is a problem that the size of an image capturing apparatus body in the width direction is increased.

SUMMARY OF THE INVENTION

The present invention provides an image capturing apparatus that is made compact in the size of an apparatus body, particularly the size in a width direction thereof, without impairing operability thereof.

The present invention provides an image capturing apparatus comprising connection terminals for connecting external devices thereto, an air inlet port via which air is drawn in for cooling heat sources of an apparatus body, and an air outlet port via which the air is discharged, wherein a connection terminal arrangement surface where the connection terminals are arranged and an air outlet port arrangement surface where the air outlet port is arranged form respective different surfaces, and also are inclined at predetermined angles with respect to an optical axis, respectively, and wherein the connection terminal arrangement surface and the air outlet port arrangement surface are arranged to be displaced in a left-right direction, as viewed from a side of the image capturing apparatus, and also are arranged to overlap each other, as viewed from a front of the image capturing apparatus.

According to the present invention, the connection terminal arrangement surface where the connection terminals are arranged and the air outlet port arrangement surface where the air outlet port is arranged form different surfaces, and also are inclined at predetermined angles with respect to the optical axis, respectively. Further, the connection terminal arrangement surface and the air outlet port arrangement surface are arranged to be displaced in a left-right direction, as viewed from a side of the image capturing apparatus. Further, the two arrangement surfaces are arranged to overlap each other, as viewed from a front of the image capturing apparatus. This makes it possible to reduce the size of the image capturing apparatus in the width direction.

Further features of the present invention will become apparent from the following description of exemplary embodiments (with reference to the attached drawings).

BRIEF DESCRIPTION OF THE DRAWINGS

FIGS. 4A to 4D are perspective views of an expansion module that can be attached to the image capturing apparatus body.

DESCRIPTION OF THE EMBODIMENTS

Figure 1A:
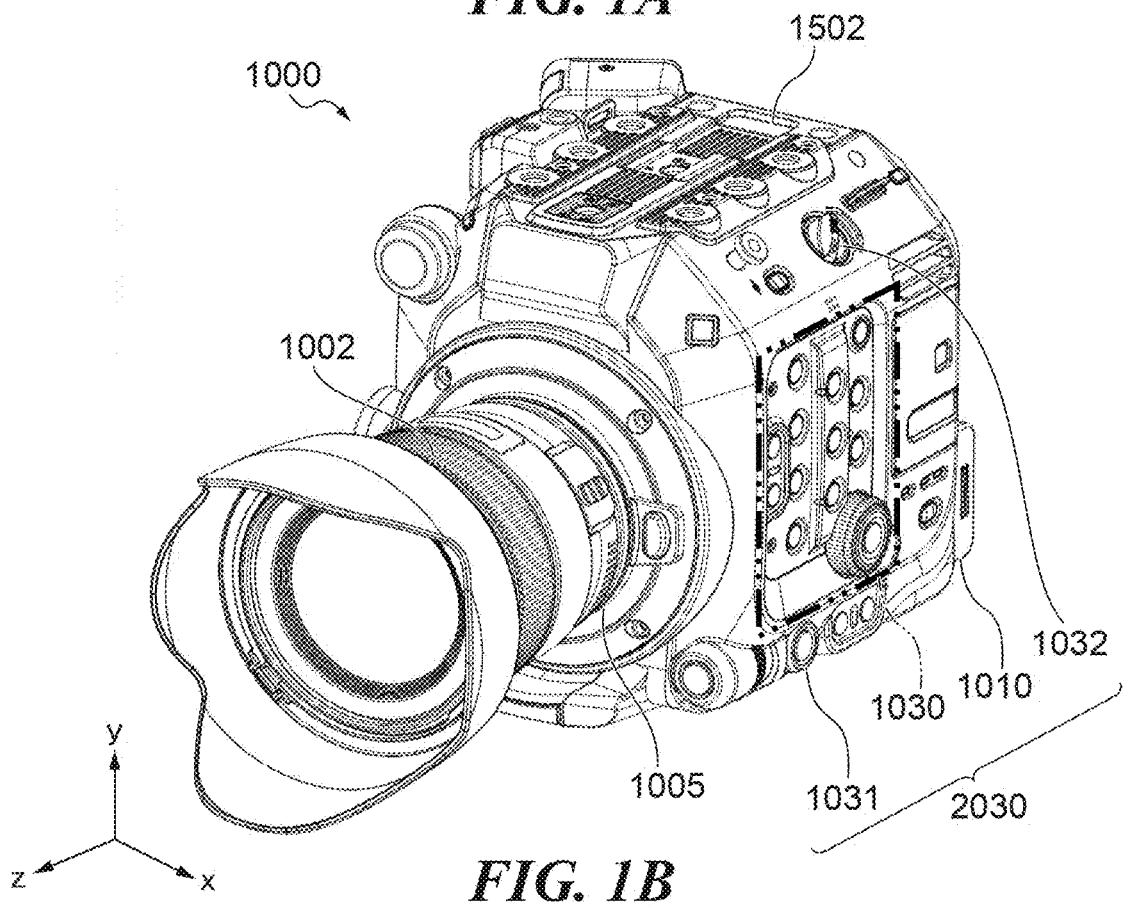
FIGS. 1A and 1B are perspective views of an image capturing apparatus according to an embodiment of the present invention.
Figure 1B:
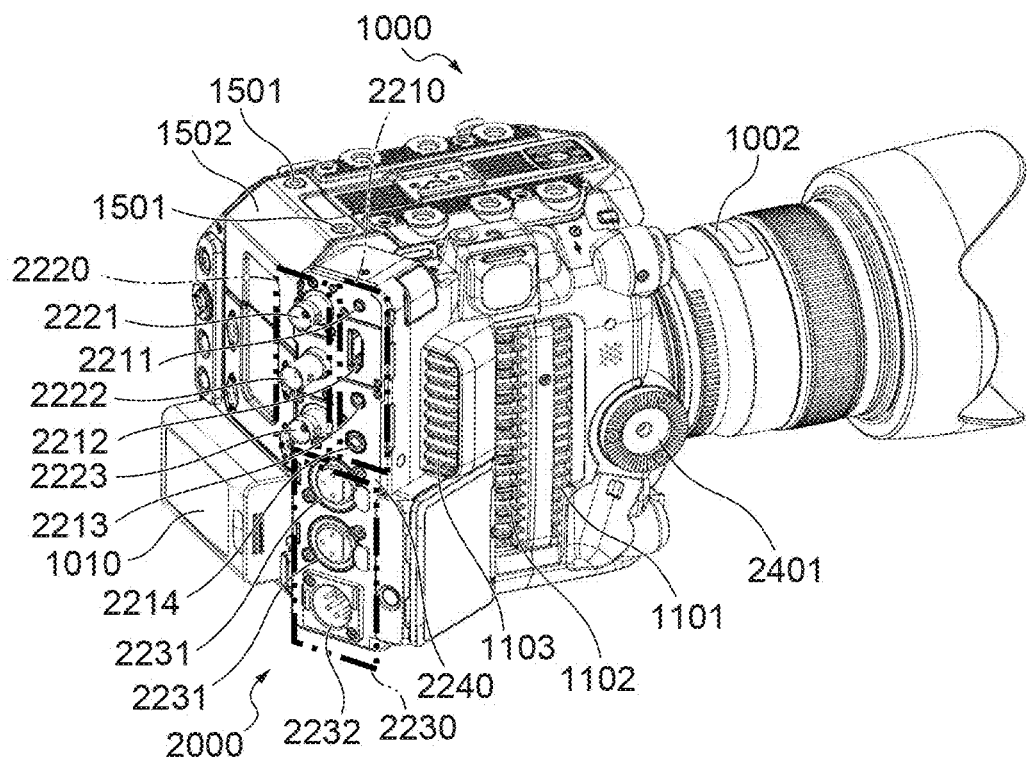

The present invention will now be described in detail below with reference to the accompanying drawings showing embodiments thereof. FIGS. 1A and 1B are perspective views of an image capturing apparatus according to an embodiment of the present invention, which show the image capturing apparatus 1001 with a lens 1002 attached to an image capturing apparatus body 1000 thereof. FIG. 1A is a perspective view of the image capturing apparatus body 1000, as viewed from the front and above, and FIG. 1B is a perspective view of the same, as viewed from the rear and above. Note that the coordinate system in the present embodiment is defined as shown in FIG. 1A for convenience of explanation. That is, the z-axis is defined to extend in a front-rear direction of the image capturing apparatus body 1000 (the direction toward the lens 1002 on the front side is defined as a +z direction), the y-axis is defined to extend in a vertical direction of the image capturing apparatus body 1000 (the direction toward a top side is defined as a +y direction), and the x-axis is defined to extend in a left-right direction (width direction) of the image capturing apparatus body 1000 (the direction toward a right side as viewed from the front is defined as a +x direction).

The image capturing apparatus body 1000 is a lens interchangeable digital video camera. The image capturing apparatus body 1000 is provided with a mount 1005, as a lens attachment portion, on which and from which the lens 1002 can be mounted and removed. An image sensor 1007 (described hereinafter with reference to FIG. 2) for receiving incident light from an object is incorporated in the image capturing apparatus body 1000 located rearward of the mount 1005. On the right side of the image capturing apparatus body 1000 as viewed from the front, there are arranged a body operation button group 1030 for causing the image capturing apparatus body 1000 to execute predetermined operations by operations of a photographer, a body REC button 1031, and a power switch 1032.

Next, a description will be given of input/output terminals provided in the image capturing apparatus body 1000.

A rear input/output terminal (connection terminal) group 2000 for electrically connecting the image capturing apparatus body 1000 and external devices via cables is arranged on a rear left side of the image capturing apparatus body 1000 (FIG. 1B). The rear input/output terminal group 2000 is formed by a first terminal group (connection terminals in a first column) 2210, a second terminal group (connection terminals in a second column) 2220, and a third terminal group (connection terminals in a third column) 2230, each illustrated in a state surrounded by dashed double-dotted lines. Hereafter, the "connection terminal" is abbreviatedly referred to as the "terminal", as deemed appropriate.

The first terminal group (the connection terminals in the first column) 2210 includes a small-sized controller terminal 2211, a multi-pin video terminal 2212, a microphone terminal 2213, and a headphone terminal 2214. The small-sized controller terminal 2211 is a terminal into which a 3-pole Φ2.5 pin plug can be inserted. When the image capturing apparatus body 1000 is connected to an external controller via a cable including this plug, it is possible to control the image capturing apparatus body 1000 by the external controller. The multi-pin video terminal 2212 is a so-called HDMI (High-Definition Multimedia Interface: registered trademark) output terminal. By connecting the multi-pin video terminal 2212 and an external monitor via a cable, it is possible to display through images or recorded videos shot by the image capturing apparatus body 1000 on the external monitor. The microphone terminal 2213 is a terminal into which a 3-pole Φ3.5 pin plug can be inserted. It is possible to connect the microphone terminal 2213 and an external microphone capable of collecting stereo sound by a cable including this plug. When the microphone terminal 2213 and the external microphone are connected, the image capturing apparatus body 1000 can receive stereo audio signals. The headphone terminal 2214 is a terminal into which a 3-pole Φ3.5 pin plug can be inserted. The headphone terminal 2214 and an audio output device, such as a headphone or an earphone, are connected by a cable including this plug. When the headphone terminal 2214 and the headphone or the earphone are connected, it is possible to output sound collected by the image capturing apparatus body 1000. Further, the first terminal group 2210 is formed by terminals which do not protrude from a connection terminal arrangement surface 2240, i.e. so-called recessed terminals.

The second terminal group (the connection terminals in the second column) 2220 is formed by a monitor terminal 2221, a 12G-SDI terminal 2222, and a time code terminal 2223. Although the three terminals of the second terminal group 2220 are all BNC connectors to which BNC plugs having the same shape can be connected, signals that can be delivered therefrom are different from each other. The monitor terminal 2221 can mainly output developed 2K60P videos or undeveloped raw 2K60P video signals, for external monitoring. The 12G-SDI terminal 2222 can deliver developed high-definition 4K60P videos or undeveloped raw high-definition 4K60P video signals, for recording in a recorder. The time code terminal 2223 is a terminal that can deliver time code signals. The second terminal group 2220 is formed by terminals which protrude from the connection terminal arrangement surface 2240, i.e. so-called protruding terminals.

The third terminal group (the connection terminals in the third column) 2230 is formed by large-sized microphone terminals 2231 and a power input terminal 2232, which are large-sized terminals. Each large-sized microphone terminal 2231 is a 3-pin XLR terminals, which, by being connected to an external microphone via a cable, enables the image capturing apparatus body 1000 to receive a monaural audio signal. The power input terminal 2232 is a 4-pin XLR terminal. When electrical power of approximately 12.6 V is input via the power input terminal 2232, the image capturing apparatus body 1000 can be driven by the electrical power. Further, as shown in FIG. 1B, since a body battery 1010 can be attached to the image capturing apparatus body 1000, it is also possible to drive the image capturing apparatus body 1000 using electrical power from the body battery 1010.

As shown in FIG. 1B, the first terminal group 2210, the second terminal group 2220, and the third terminal group 2230 are arranged on the connection terminal arrangement surface 2240, which is one flat surface. Further, the first terminal group 2210, the second terminal group 2220, and the third terminal group 2230 are arranged on the connection terminal arrangement surface 2240 such that the direction of inserting and removing cables into and from associated terminals of the terminal groups 2210, 2220, and 2230 is perpendicular to the connection terminal arrangement surface 2240. Since the terminals of the third terminal group 2230 are large in size, they are arranged in a single column on the connection terminal arrangement surface 2240. Further, since the terminals of the third terminal group 2230 are large in size, the cables inserted into and removed from the terminals are also large. For this reason, the third terminal group 2230 is arranged on the lower part of the connection terminal arrangement surface 2240 such that when the inserted cables hang down by gravity, the hanging cables are prevented from becoming obstacles to other operations of the photographer.

The terminals of the first terminal group 2210 and the second terminal group 2220 are smaller than the terminals of the third terminal group 2230. Therefore, the terminals of the first and second terminal groups 2210 and 2220 are arranged on the connection terminal arrangement surface 2240 such that the first terminal group 2210 and the second terminal group 2220 form two parallel columns. By arranging the smaller terminals on the connection terminal arrangement surface 2240 in two parallel columns, it is possible to arrange a large number of terminals in a limited area of the connection terminal arrangement surface 2240.

A large number of terminals are disposed on the connection terminal arrangement surface 2240. The connection terminal arrangement surface 2240 is arranged to be inclined at a predetermined angle, e.g. 30 degrees, with respect to a plane perpendicular to the optical axis of the image capturing apparatus body 1000, for the purpose of preventing the connection terminal arrangement surface 2240 from becoming an obstacle to the photographer at the time of shooting, and in consideration of the ease of inserting and removing the cables.

Next, detailed description will be given of forced air cooling for cooling the image capturing apparatus body 1000, and a method of the forced air cooling.

As shown in FIG. 1B, on a left side of the image capturing apparatus body 1000 as viewed from the front, there are arranged a first air inlet port 1101, a second air inlet port 1102, and an air outlet port 1103. These air inlet and outlet ports are part of a structure for forced air cooling of the image sensor 1007 and a main circuit board 1110, which are main heat sources of the image capturing apparatus body 1000. The image capturing apparatus body 1000 has the mount 1005 provided on the front surface thereof, for mounting the lens 1002 thereon, and an attachment portion provided on the rear surface thereof, for attaching an expansion module 4500, described hereinafter, to the image capturing apparatus body 1000. Further, the image capturing apparatus body 1000 has a tripod attachment portion provided in the lower part thereof, and has attachment portions provided on the upper part thereof, for attaching accessories and the like to the image capturing apparatus body 1000. Further, buttons of the body operation button group 1030 are disposed all over the entire right-side surface of the image capturing apparatus body 1000. For this reason, the first air inlet port 1101, the second air inlet port 1102, the air outlet port 1103, and the connection terminals for external devices are arranged on the remaining left-side surface, i.e. a grip-side surface, of the image capturing apparatus body 1000.

As shown in FIG. 1B, the left-side surface of the image capturing apparatus 1001 including the image capturing apparatus body 1000 is the grip-side surface where a grip unit 2080, referred to hereinafter, is attached, and hence includes a grip unit attachment portion 2401 for attaching the grip unit 2080 to the image capturing apparatus body 1000. The grip unit attachment portion 2401 is an accessory fixing portion having a shape of a circle, which is commonly referred to as a rosette. Therefore, the grip unit attachment portion 2401 has protruding-shape portions and recessed-shape portions radially formed at predetermined intervals with the center of the circle as the radial center, and has a screw hole in the center thereof. By attaching the grip unit 2080 having a rosette to the image capturing apparatus body 1000 using the grip unit attachment portion 2401, it is possible to perform shooting with the image capturing apparatus body 1000 held by hand. In handheld shooting, the photographer normally performs the shooting while holding the grip unit 2080 with his/her right hand. To this end, the grip unit attachment portion 2401 is disposed on the left side of the image capturing apparatus body 1000 as viewed from the front. Further, an accessory other than the grip unit 2080 can be attached by the grip unit attachment portion 2401, insofar as the accessory has a rosette.

Figure 21:
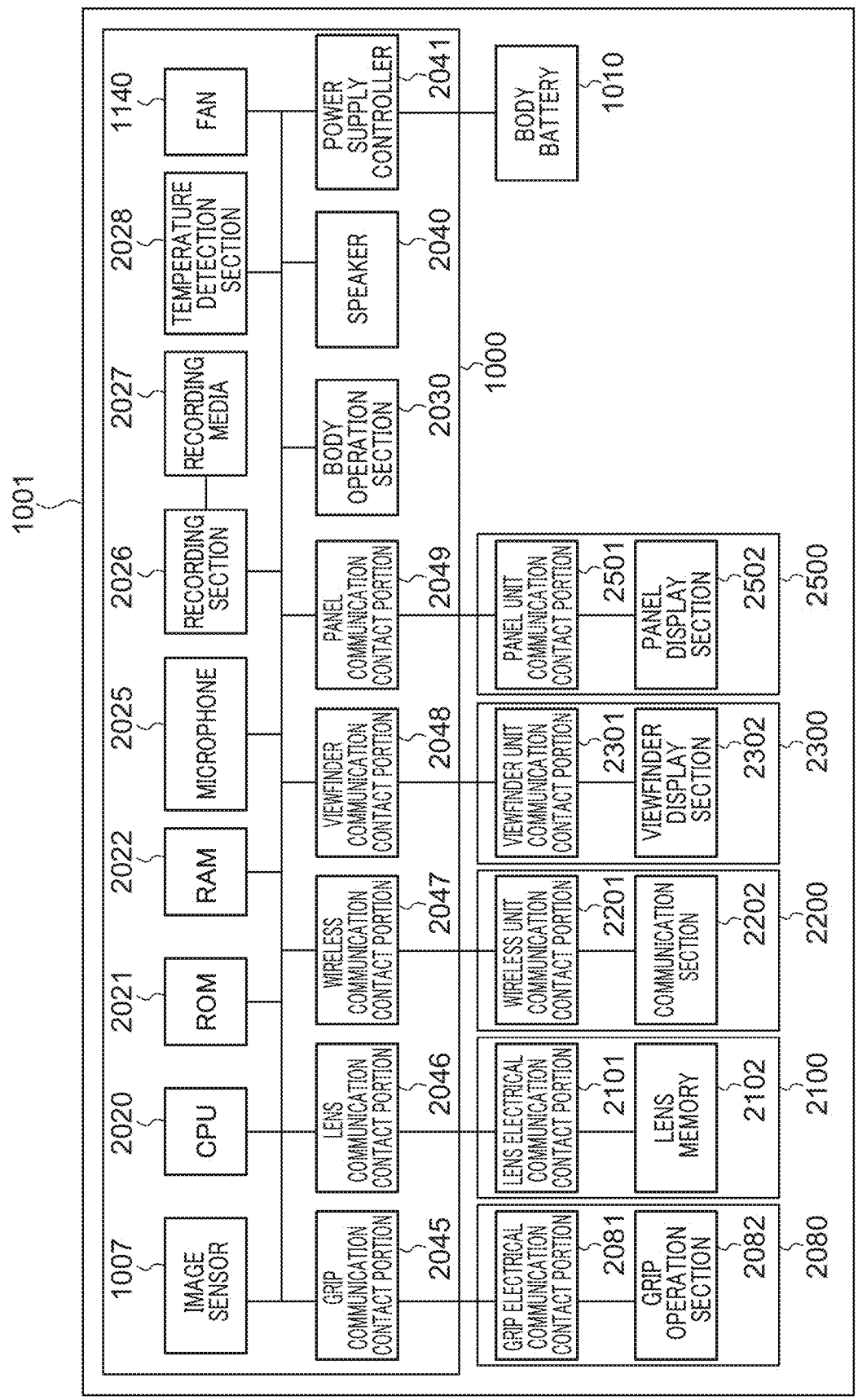
FIG. 21 is a schematic block diagram showing the configuration of the image capturing apparatus.

FIG. 21 is a schematic block diagram showing the functional configuration of the image capturing apparatus 1001. The functional configuration of the image capturing apparatus 1001 will be described with reference to FIG. 21.

The image capturing apparatus body 1000 includes the image sensor 1007, a CPU 2020, a ROM 2021, a RAM 2022, a microphone 2025, a recording section 2026, a body operation section 2030, a speaker 2040, and a power supply controller 2041. Further, the image capturing apparatus body 1000 includes a grip communication contact portion 2045, a lens communication contact portion 2046, a wireless communication contact portion 2047, a finder communication contact portion 2048, and a panel communication contact portion 2049.

The grip unit 2080 includes a grip electrical communication contact portion 2081 and a grip operation section 2082. A lens barrel 2100 includes a lens electrical communication contact portion 2101 and a lens memory 2102. A wireless unit 2200 includes a wireless unit communication contact portion 2201 and a communication section 2202. A viewfinder unit 2300 includes a viewfinder unit communication contact portion 2301 and a viewfinder display section 2302. A panel unit 2500 includes a panel unit communication contact portion 2501 and a panel display section 2502.

The image sensor 1007 is a CCD or a CMOS image sensor, and includes an analog-to-digital converter. The lens barrel 2100 forms an optical image of incident light on the image sensor 1007. The image sensor 1007 converts the optical image formed thereon to analog electrical signals, and then further converts the analog electrical signals to digital signals using the analog-to-digital converter to output video data.

Figure 2A:
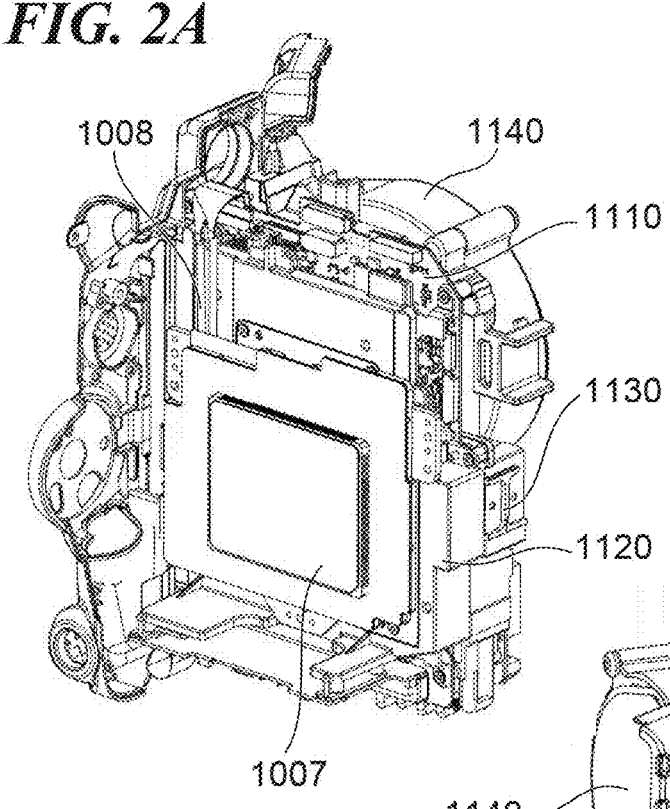
FIGS. 2A to 2C are perspective views of main heat sources and a cooling mechanism of an image capturing apparatus body.
Figure 2B:
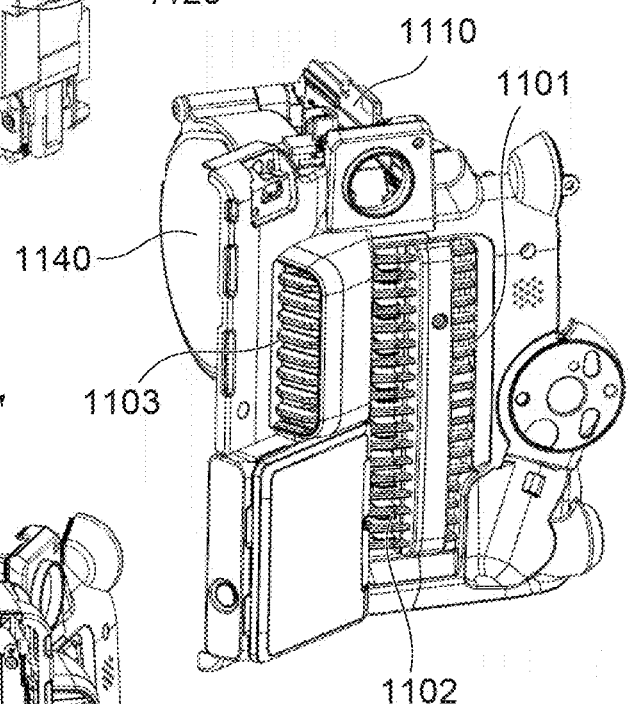
Figure 2C:
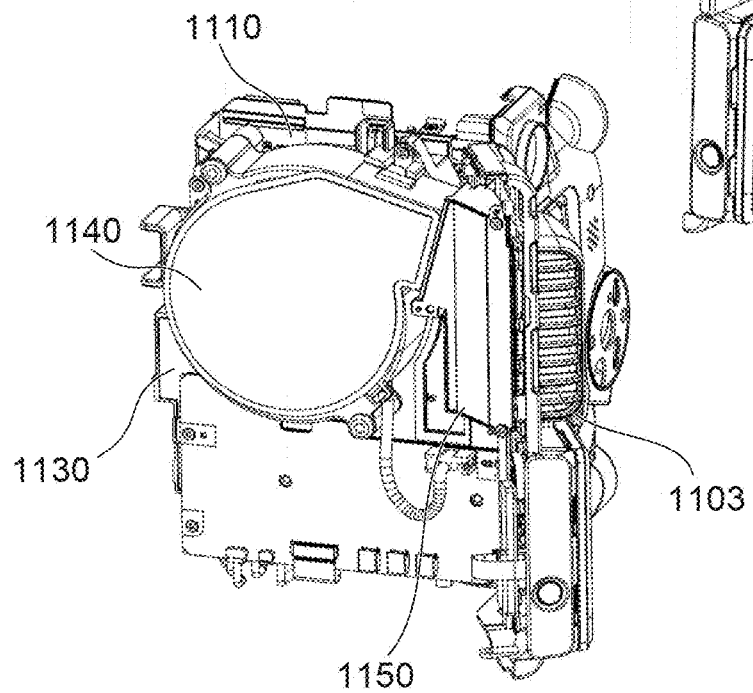

The CPU 2020, the ROM 2021, and the RAM 2022 are mounted on the main circuit board 1110 (see FIGS. 2A to 2C). The ROM 2021 is an electrically erasable and recordable memory, and is implanted, for example, by an EEPROM. The ROM 2021 stores constants, programs, etc. for the operation of the CPU 2020. The CPU 2020 realizes the centralized control of the image capturing apparatus body 1000 by executing the programs stored in the ROM 2021 to thereby control the operations of the components of the image capturing apparatus body 1000.

The RAM 2022 is used as a system memory, a work memory, an image memory, a sound/voice memory, etc., and the constants, variables, and the programs read from the ROM 2021, etc., for the operation of the CPU 2020 are loaded in the RAM 2020. Audio signals input from the microphone 2025 are subjected to gain control to a predetermined level and thereafter converted from analog to digital to form digital audio data. The video data and the audio data are temporarily stored in the RAM 2022.

The CPU 2020 sends the video data and audio data temporarily stored in the RAM 2022 to the recording section 2026. Recording media 2027 can be inserted and removed into and from the recording section 2026, and the video data and audio data are recorded in the recording media 2027. The recording section 2026 records the video data and the audio data in the recording media 2027. Note that as the recording media 2027, removal flash memories, such as SD cards, are used.

A temperature detection section 2028 is e.g. a thermistor, and is mounted on the main circuit board 1110 (see FIGS. 2A to 2C). A fan 1140 is operated based on a temperature acquired by the temperature detection section 2028, and draws air into and discharges the same from the inside of the image capturing apparatus body 1000. The rotational state of the fan 1140 is controlled by the CPU 2020. The body operation section 2030 transfers an instruction input by a user's operation to the CPU 2020. The body operation section 2030 (see FIG. 1 as well) includes the body REC button 1031, the power switch 1032, the body operation button group 1030. An operation sound generated when the body operation section 2030 is operated, a beep generated when starting or stopping storing of a video, etc., are output from the speaker 2040 under the control of the CPU 2020.

The power supply controller 2041 is formed by a battery detection circuit, a DC-DC converter, and a switch circuit for switching a block to be energized, etc., and detects whether or not a battery is attached, a battery type, and a battery remaining amount. The body battery 1010 which supplies electrical power to the image capturing apparatus body 1000 is removably attached to the image capturing apparatus body 1000, and is e.g. a lithium ion battery.

When the grip communication contact portion 2045 of the image capturing apparatus body 1000 and the grip electrical communication contact portion 2081 of the grip unit 2080 are brought into contact with each other to be electrically connected to each other, the CPU 2020 of the image capturing apparatus body 1000 detects attachment of the grip unit 2080. When the grip operation section 2082 of the grip unit 2080 is operated by a user, various instructions from the user are transmitted to the CPU 2020.

When the lens communication contact portion 2046 of the image capturing apparatus body 1000 and the lens electrical communication contact portion 2101 of the lens barrel 2100 are brought into contact with each other to be electrically connected to each other, the CPU 2020 of the image capturing apparatus body 1000 detects attachment of the lens barrel 2100. When attachment of the lens barrel 2100 is detected, the CPU 2020 reads lens information from the lens memory 2102, and stores the read lens information in the RAM 2022.

When the wireless communication contact portion 2047 of the image capturing apparatus body 1000 and the wireless unit communication contact portion 2201 of the wireless unit 2200 are brought into contact with each other to be electrically connected to each other, the CPU 2020 of the image capturing apparatus body 1000 detects attachment of the wireless unit 2200. When attachment of the wireless unit 2200 is detected, the CPU 2020 sends the video data and audio data stored in the RAM 2022 to the wireless unit 2200. The communication section 2202 of the wireless unit 2200 transmits the video data and audio data sent from the RAM 2022 to an external device (not shown).

When the finder communication contact portion 2048 of the image capturing apparatus body 1000 and the viewfinder unit communication contact portion 2301 of the viewfinder unit 2300 are brought into contact with each other to be electrically connected to each other, the CPU 2020 of the image capturing apparatus body 1000 detects attachment of the viewfinder unit 2300. When attachment of the viewfinder unit 2300 is detected, the CPU 2020 sends the video data stored in the RAM 2022 to the viewfinder unit 2300. The viewfinder display section 2302 of the viewfinder unit 2300 is e.g. a liquid crystal display device, and displays the operating status of the image capturing apparatus body 1000, etc., as on-screen display information on an as-needed basis.

When the panel communication contact portion 2049 of the image capturing apparatus body 1000 and the panel unit communication contact portion 2501 of the panel unit 2500 are brought into contact with each other to be electrically connected to each other, the CPU 2020 of the image capturing apparatus body 1000 detects attachment of the panel unit 2500. When attachment of the panel unit 2500 is detected, the CPU 2020 sends the video data stored in the RAM 2022 to the panel unit 2500. The panel display section 2502 of the panel unit 2500 is e.g. a liquid crystal display device, and displays the operating status of the image capturing apparatus body 1000, as the on-screen display information, on an as-needed basis. Note that, information displayed on the panel display section 2502 and information displayed on the viewfinder display section 2302 may be made identical or different, by configuration by the user.

In the image capturing apparatus 1001 of the present embodiment, for example, light received by the image sensor 1007 is converted to digital image data of at least approximately 23 frames per second (fps), and the digital image data is recorded in one of the recording media 2027 by the recording section 2026. The frame rate can be set within a range from approximately 1 fps to not lower than approximately 250 fps. For example, the image capturing apparatus 1001 may change the frame rate according to a set resolution. More specifically, a frame rate within a range from approximately 1 fps to approximately 100 fps is set in a "5K" resolution mode, a frame rate within a range from approximately 1 fps to approximately 125 fps is set in a "4K" resolution mode, and a frame rate within a range from approximately 1 fps to approximately 125 fps is set in a Quad HD mode. A frame rate within a range from approximately 1 fps to approximately 160 fps is set in a "3K" resolution mode, and a frame rate within a range from approximately 1 fps to approximately 250 fps is set in a "2K" resolution mode. For example, as the frame rate, 20, 23, 976, 24, 30, 60 and 120 fps, or other frame rates between these frame rates, or frame rates not lower than these frame rates may be set.

The image capturing apparatus 1001 can output image data at a resolution of "2K" (such as 16:9 (2048×1152 pixels) and 2:1 (2048×1024 pixels)), a resolution of "3K" (such as 16:9 (3072×1728 pixels) and 2:1 (3072×1536 pixels)), a resolution of "4K" (such as 4096×2540 pixels, 16:9 (4096×2304 pixels), and 2:1 (4096×2048 pixels)), a resolution of "4.5K", a resolution of Quad HD (such as 3840×2160 pixels), a resolution of "5K" (such as 5120× 2700 pixels), a resolution of "6K" (such as 6144×3160 pixels), a resolution of "8K" (such as 7680×4320 pixels), or a resolution higher than 8K. The image capturing apparatus 1001 can be configured to record or output image data having a horizontal resolution at least between any values of the above-mentioned resolutions.

Further, the resolution is at least one of the above-mentioned values (or some value between the above-mentioned values), and can take approximately 6.5K, 7K, 8K, 9K, or 10K, or some value between the above-mentioned values. In the present embodiment, in information expressed by the form of xK (such as the above-mentioned 2K and 4K), the number of "x" refers to an approximate horizontal resolution. Therefore, the resolution of "4K" corresponds to the number of horizontal pixels which is approximately not smaller than 4000, and the resolution of "2K" corresponds to the number of horizontal pixels which is approximately not smaller than 2000.

The image sensor 1007 can be adapted to a range from approximately 0.5 inch (8 mm) to ⅔ inch, S35 for a movie, 35 mm full-frame for a still camera, and up to 645, and can be adapted to at least approximately 1.0 inch or 6 cm×17 cm or more. Further, the image sensor 1007 can have sizes of at least approximately 10.1 mm×5.35 mm, 24.4 mm×13.7 mm, 30 mm×15 mm, 36 mm×24 mm, 56 mm×42 mm, and 186 mm×56 mm. Further, the image sensor 1007 can be configured to provide a variable resolution by selectively outputting only predetermined part of the pixel area. The image sensor 1007 can include e.g. color filters arranged in the Bayer array. Therefore, the image sensor 1007 outputs data indicating an amount of red light, green light, or blue light, detected by each photoelectric conversion element of the image sensor 1007.

Next, a method of forced air cooling of the image sensor 1007 and the main circuit board 1110, which are the main heat sources of the image capturing apparatus body 1000, will be described in detail.

Figure 3A:
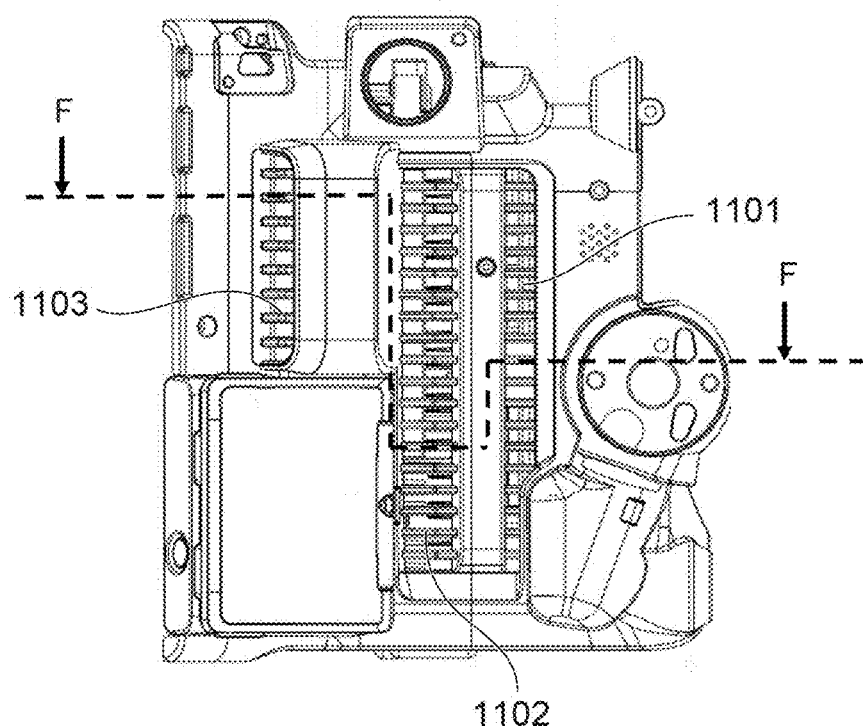
FIGS. 3A and 3B are a left side view of the cooling mechanism and a cross-sectional view illustrating flows of air in the cooling mechanism.
Figure 3B:
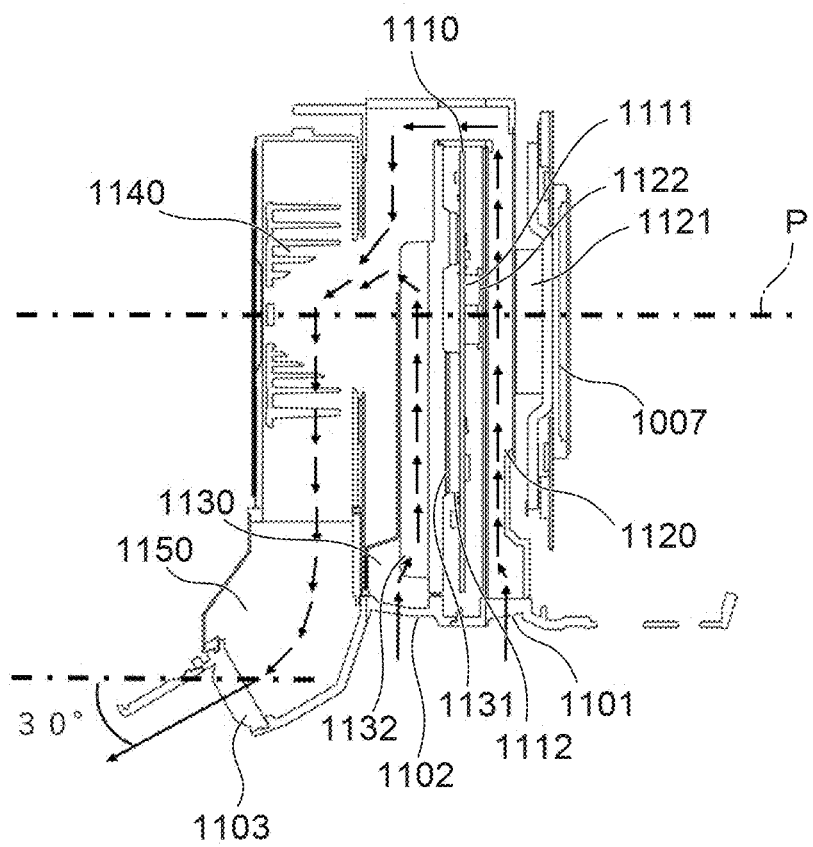

FIGS. 2A to 2C are perspective views of the main heat sources and the cooling mechanism of the image capturing apparatus body 1000. FIG. 2A is a perspective view of the cooling mechanism, as viewed from the right front. FIG. 2B is a perspective view of the cooling mechanism, as viewed from the left. FIG. 2C is a perspective view of the cooling mechanism, as viewed from the rear. Further, FIGS. 3A and 3B are a left side view of the cooling mechanism shown in FIGS. 2A to 2C and a cross-sectional view illustrating flows of air in the cooling mechanism. In FIG. 3A, line F-F indicates the location of a cross-section shown in FIG. 3B, and in FIG. 3B, the flows of air are illustrated on the cross-section as viewed in the location indicated in FIG. 3A. Note that in FIG. 3B, the flows of air are indicated by arrows for convenience of explanation.

Referring to FIG. 2A, the main heat sources of the image capturing apparatus body 1000 are the image sensor 1007 and the main circuit board 1110. The image sensor 1007 is an element that converts an optical image formed thereon by the lens 1002 to 4K60p electrical signals. Further, the image sensor 1007 is a large-format image sensor of which the size is commonly called full-frame. Therefore, the image sensor 1007 is capable of outputting high-definition video signals. The electrical signals converted from the optical image by the image sensor 1007 are sent to the main circuit board 1110 via image sensor wires 1008. The signals sent to the main circuit board 1110 are converted by the main circuit board 1110 to raw video signals or video signals in one of formats into which the signals are developed. The video signals generated by the conversion are sent to an external device e.g. by the rear input/output terminal group 2000. The image sensor 1007 is disposed such that it perpendicularly intersects with the optical axis of the image capturing apparatus body 1000.

As shown in FIGS. 2A to 2C, a forced air-cooling structure for mainly cooling the image sensor 1007 and the main circuit board 1110 is divided into the following four parts: The first one is an image sensor duct structure 1120 for mainly air-cooling the image sensor 1007. The second one is a main circuit board duct structure 1130 for mainly air-cooling the main circuit board 1110. The third one is the fan 1140 for causing air to flow from the first air inlet port 1101 and the second air inlet port 1102 to the air outlet port 1103. The fourth one is an air outlet duct 1150 for delivering the air to the air outlet port 1103.

Next, the method of cooling the image sensor 1007 and the main circuit board 1110 will be described in detail with reference to FIG. 3B, which shows the flows of cooling air.

First, cooling air drawn into the inside of the image capturing apparatus body 1000 from the first air inlet port 1101 is sent to the image sensor duct structure 1120. The front side of the image sensor duct structure 1120 is thermally connected to the image sensor 1007 by an image sensor thermally conductive member 1121, which is a thermally conductive member. Therefore, heat of the image sensor 1007 is transferred to air flowing downstream through the image sensor duct structure 1120 to warm the air, whereby the image sensor 1007 is air-cooled. The rear side of the image sensor duct structure 1120 is thermally connected to a main circuit board small-sized device 1111, which is disposed on the main circuit board 1110 and generates a relatively small amount of heat, via a small-sized device thermally conductive member 1122. As a consequence, the main circuit board small-sized device 1111 as well is air-cooled by the cooling air drawn into the inside of the image capturing apparatus body 1000 from the first air inlet port 1101.

The image capturing apparatus body 1000 can take in air also from the second air inlet port 1102. Cooling air drawn into the image capturing apparatus body 1000 from the second air inlet port 1102 is sent to the main circuit board duct structure 1130. The front side of the main circuit board duct structure 1130 is thermally connected to a main circuit board large-sized device 1112, which is disposed on the main circuit board 1110 and generates a relatively large amount of heat, via a large-sized device thermally conductive member 1131, which is a thermally conductive member. Therefore, heat of the main circuit board large-sized device 1112 is transferred to air flowing through the main circuit board duct structure 1130. The main circuit board large-sized device 1112 generates a relatively large amount of heat, and hence to cool the main circuit board large-sized device 1112, it is necessary to increase the amount of heat transferred to the cooling air. To this end, the main circuit board duct structure 1130 has a plurality of fin shapes 1132 (only one of them is shown) in a depth direction of the sheet of FIG. 3B. By providing the plurality of fin shapes 1132 to increase the surface area of the inside of the main circuit board duct structure 1130, it is possible to efficiently transfer the amount of heat of the main circuit board large-sized device 1112 to the cooling air. The air warmed by cooling the main circuit board large-sized device 1112 is delivered to a downstream side of the main circuit board duct structure 1130.

The air warmed while flowing through the image sensor duct structure 1120 and the air warmed while flowing through the main circuit board duct structure 1130 merge together and the merged air is sent to the fan 1140. The fan 1140 is e.g. a centrifugal fan. Negative pressure is generated by the fan 1140 at an inlet thereof, whereby air taken in from the first air inlet port 1101 and the second air inlet port 1102 is excellently sent to the fan 1140.

The merged air formed by the air warmed while flowing through the image sensor duct structure 1120 and the air warmed while flowing through the main circuit board duct structure 1130 is taken into the fan 1140 and sent to the air outlet duct 1150. The air sent to the air outlet duct 1150 is discharged out of the image capturing apparatus body 1000 through the air outlet port 1103. In image capturing apparatus body 1000, the first air inlet port 1101 and the second air inlet port 1102 are disposed close to the air outlet port 1103. For this reason, there is a fear that the warmed air discharged from the air outlet port 1103 is taken in from the first air inlet port 1101 or the second air inlet port 1102 again, causing degradation of the efficiency of the forced air cooling.

To solve this problem, in the image capturing apparatus body 1000, an angle is formed between a direction in which the first air inlet port 1101 and the second air inlet port 1102 are oriented, and a direction in which the air outlet port 1103 is oriented. More specifically, as shown in FIG. 3B, an air outlet direction of the air outlet port 1103 of the air outlet duct 1150 is set to be inclined at 60 degrees with respect to an air inlet direction of the first air inlet port 1101 and the second air inlet port 1102. That is, the air outlet direction of the air outlet port 1103 of the air outlet duct 1150 is configured to be inclined at 30 degrees with respect to the optical axis P of the image capturing apparatus body 1000 such that exhaust air is discharged diagonally rearward in parallel with the rearward input/output terminal group 2000. By discharging exhaust air diagonally rearward, the air outlet port 1103 prevents warmed air from being taken in from the first air inlet port 1101 or the second air inlet port 1102 again. The image sensor 1007 and the main circuit board 1110, which are the main heat sources of the image capturing apparatus body 1000, are cooled by the above-described forced air-cooling structure.

Next, a description will be given of expandability of the image capturing apparatus body 1000.

By attaching the expansion module 4500 to a rear side of the image capturing apparatus body 1000, it is possible to expand the functions of the image capturing apparatus.

FIGS. 4A to 4D are perspective views of the expansion module that can be attached to the image capturing apparatus body. FIG. 4A is a perspective view of the expansion module 4500, as viewed from the rear and above. FIG. 4B is a perspective view of the expansion module 4500, as viewed from the front and above. FIG. 4C is a perspective view of the expansion module 4500, as viewed from the rear and below. FIG. 4D is a perspective view of the expansion module 4500 in a state in which a protection cover group 4511 of the FIG. 4A expansion module 4500 is attached to a terminal group 4510 of the expansion module 4500.

As shown in FIG. 4B, the expansion module 4500 includes an expansion module contact portion 4502 provided at a front portion thereof, for performing electrical communication with the image capturing apparatus body 1000 and supplying and receiving electrical power to and from the image capturing apparatus body 1000 when the expansion module 4500 is connected to the image capturing apparatus body 1000. Further, as shown in FIGS. 4B and 4C, the expansion module 4500 includes expansion module fixing holes 4503 and expansion module fixing screw portions 4504 provided at the front portion thereof, for fixing the expansion module 4500 to the image capturing apparatus body 1000 with bolts or the like.

The expansion module 4500 includes an expansion module battery attachment portion 4521 provided at a rear portion thereof, for attaching thereto an expansion module battery 4520 (described hereinafter with reference to FIG. 6A), which has a larger size and a larger-capacity than the body battery 1010. It is possible to operate the expansion module 4500 by electrical power supplied from the expansion module battery 4520 via the expansion module battery attachment portion 4521. Further, the electrical power supplied from the expansion module battery 4520 is supplied also to the image capturing apparatus body 1000 via the expansion module contact portion 4502, and can also drive the image capturing apparatus body 1000.

Further, the expansion module 4500 includes the terminal group 4510 provided at a rear portion thereof and a plurality of input/output terminals, such as expansion module microphone terminals 4512, provided on a side surface thereof. By connecting cables to these terminals to thereby connect the expansion module 4500 to external devices, it is possible to expand the functions or performances of the image capturing apparatus body 1000.

Next, the input/output terminals of the expansion module 4500 will be described in detail.

Referring to FIG. 4A, a power output terminal 4513 of the expansion module 4500 is a terminal for supplying electrical power of 2 A at the maximum at 24 V to an external device connected to the expansion module 4500 via a cable. A GEN lock terminal 4514 is a terminal to which a BNC cable is connected, for outputting a GEN lock signal from the image capturing apparatus body 1000 to an external device. A controller terminal 4515 is a multi-pin terminal which is connected to an external controller by a cable, for inputting and outputting control signals. A wired LAN terminal 4516 is a terminal to which a LAN cable is connected to thereby connect the image capturing apparatus body 1000 to the Internet. A lens terminal 4517 is a terminal which is connected to a lens via a cable to thereby perform electrical communication between the lens and the image capturing apparatus body 1000. Note that by delivering control signals from the external controller to the image capturing apparatus body 1000 via the expansion module contact portion 4502, it is possible to control the image capturing apparatus body 1000 by the external controller.

Each expansion module microphone terminal 4512 is a terminal which is connected to an external microphone via a 3-pin XLR cable, for inputting a monaural audio signal to the image capturing apparatus body 1000. Further, when the terminal group 4510 of the expansion module 4500 is not used, as shown in FIG. 4D, the terminals of the terminal group 4510 can be protected by attaching the protection cover group 4511 to the terminal group 4510. As described above, by attaching the expansion module 4500 to the image capturing apparatus body 1000, the functions or performances of the image capturing apparatus body 1000 are expanded.

Next, a method of attaching the expansion module 4500 to the image capturing apparatus body 1000 will be described in detail.

Figure 5A:
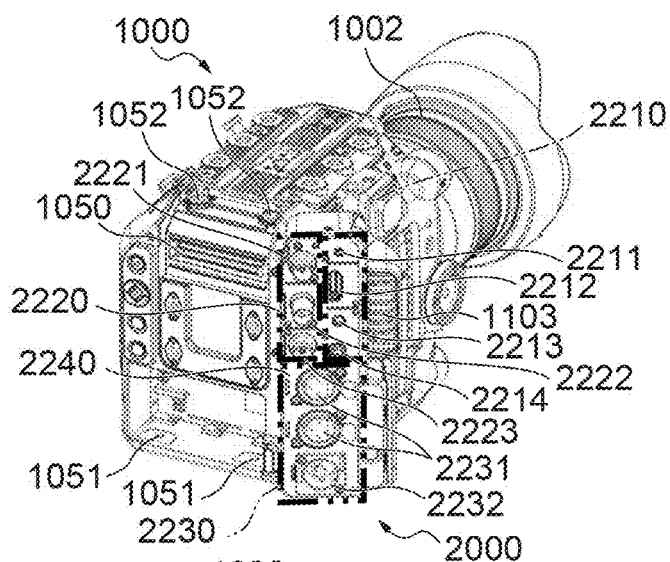
FIGS. 5A to 5C are perspective views useful in explaining a method of attaching the expansion module to the image capturing apparatus body.
Figure 5B:
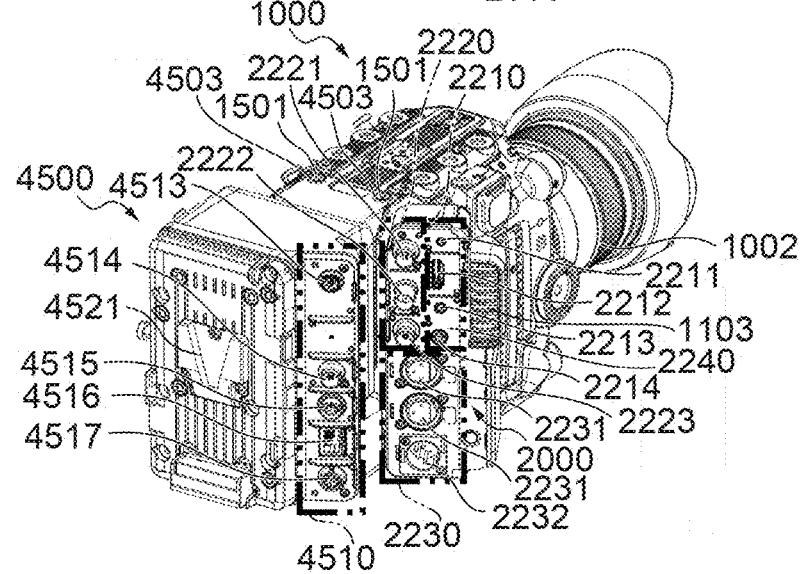
Figure 5C:
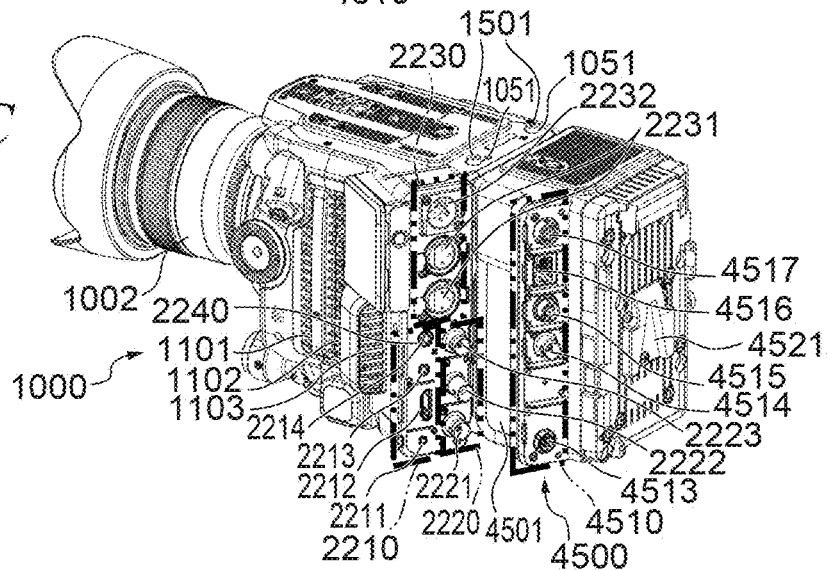

FIGS. 5A to 5C are perspective views useful in explaining the method of attaching the expansion module 4500 to the image capturing apparatus body 1000. FIG. 5A is a perspective view of the image capturing apparatus body 1000 in a state before attaching the expansion module 4500 thereto, as viewed from the rear and above. FIG. 5B is a perspective view of the image capturing apparatus body 1000 in a state after attaching the expansion module 4500 thereto, as viewed from the rear and above. FIG. 5C is a perspective view of the image capturing apparatus body 1000 in the state after attaching the expansion module 4500 thereto, as viewed from the rear and below.

To attach the expansion module 4500 to the image capturing apparatus body 1000, first, the body battery 1010 is removed from the image capturing apparatus body 1000 in the state shown in FIG. 1B. When the body battery 1010 is removed, as shown in FIG. 5A, body-side fixing holes 1051 are exposed as expansion module attachment portions at a lower portion of the image capturing apparatus body 1000. Next, a protection cover 1502 screwed using fixing bolts 1501 is removed from the image capturing apparatus body 1000 in the state shown in FIG. 1B. When the protection cover 1502 is removed, as shown in FIG. 5A, a body-side contact portion 1050 and body-side fixing screw portions 1052 are exposed as expansion module attachment portions. The body-side contact portion 1050 is a contact portion which is connected to the expansion module contact portion 4502, for performing electrical communication with the expansion module 4500 and supplying and receiving electrical power to and from the expansion module 4500.

Then, from the FIG. 5A state of the image capturing apparatus body 1000, alignment of the expansion module contact portion 4502 of the expansion module 4500 and the body-side contact portion 1050 of the image capturing apparatus body 1000 is performed such that the expansion module contact portion 4502 and the body-side contact portion 1050 can be connected to each other. After the alignment, the expansion module 4500 is attached to the image capturing apparatus body 1000 by pressing the expansion module 4500 into the image capturing apparatus body 1000 from the rear thereof. When the expansion module 4500 is thus attached to the image capturing apparatus body 1000, since the expansion module contact portion 4502 and the body-side contact portion 1050 are B-to-B (Board-to-Board) connectors, the expansion module contact portion 4502 and the body-side contact portion 1050 are fitted to each other, whereby it is possible to electrically connect them. In this state, the expansion module 4500 is not sufficiently fixed to the image capturing apparatus body 1000, and hence the expansion module fixing holes 4503 are screwed for fixation by the fixing bolts 1501 and the body-side fixing screw portions 1052. This state is shown in FIG. 5B.

Since the expansion module 4500 is attached to the image capturing apparatus body 1000 such that the expansion module 4500 covers the rear of the image capturing apparatus body 1000 from the top side to the bottom side thereof, it is necessary to fix the bottom side as well. The bottom side is fixed by screwing the body-side fixing holes 1051 for fixation using the fixing bolts 1501 and the expansion module fixing screw portions 4504 (see FIG. 4C). This state is shown in FIG. 5C. By using the fixing method described above, the expansion module 4500 is firmly attached to the image capturing apparatus body 1000 and hence is brought into a state fixed firmly enough to withstand shooting.

Next, a description will be given of a use state of the image capturing apparatus body 1000 with the expansion module 4500 attached thereto.

Figure 6A:
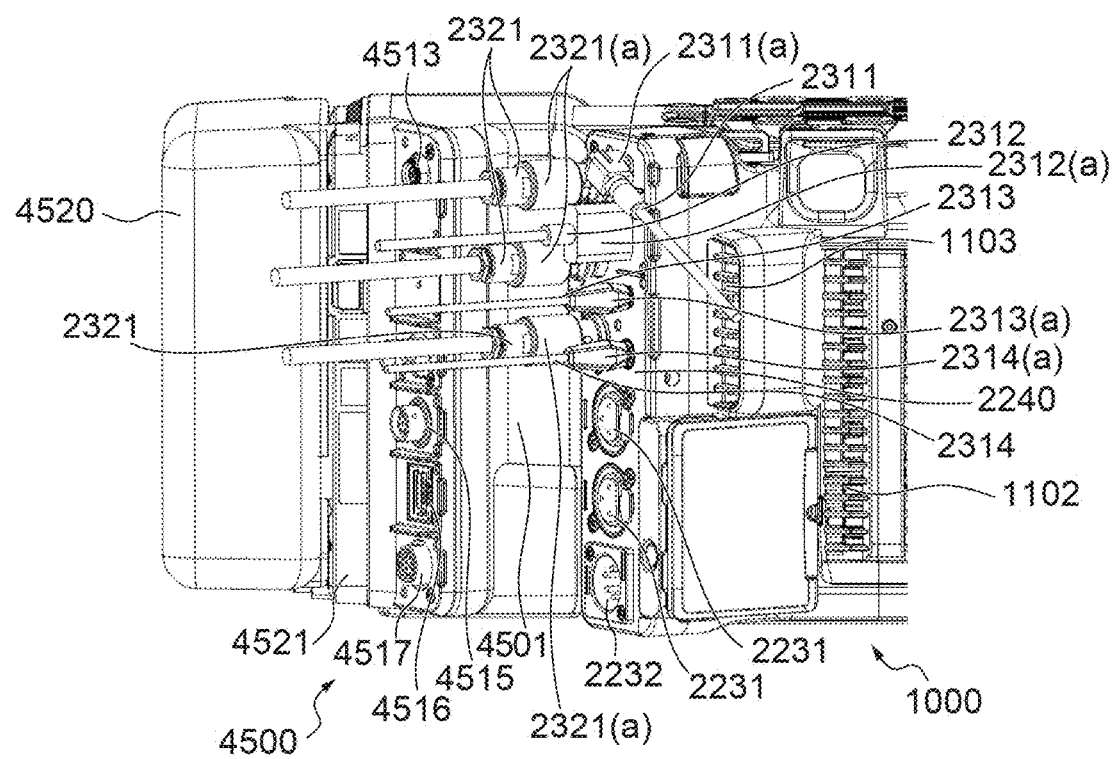
FIGS. 6A and 6B are perspective views of the appearance of the image capturing apparatus body in a use state with the expansion module attached thereto.
Figure 6B:
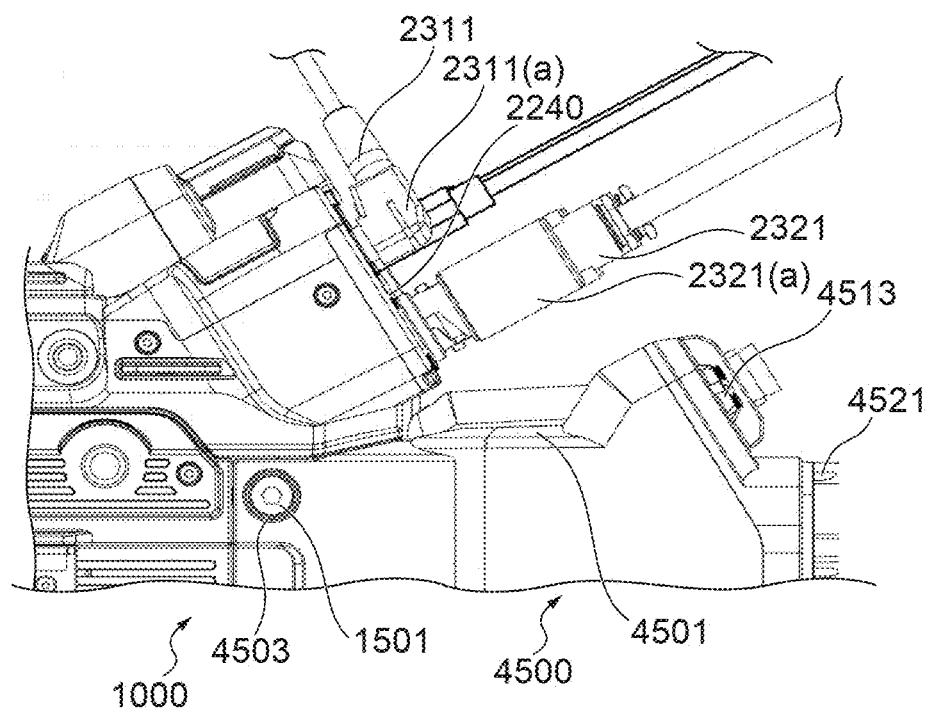

FIGS. 6A and 6B are perspective views of the appearance of the image capturing apparatus body 1000 with the expansion module 4500 attached thereto, in a use state thereof. FIG. 6A shows the use state of the image capturing apparatus body 1000, as viewed from the left. FIG. 6B shows the use state of the image capturing apparatus body 1000, as viewed from above. Further, FIG. 7 is an enlarged perspective view of the first terminal group 2210 and the second terminal group 2220 and their surroundings in a state in which the expansion module 4500 is not attached to the image capturing apparatus body 1000.

FIGS. 6A and 6B show the use state of the image capturing apparatus body 1000 which has the expansion module 4500 attached thereto and is performing shooting with electrical power supplied from the expansion module battery 4520. BNC cables 2321 are connected to the terminals of the second terminal group 2220 and are connected to respective associated ones of external devices. Further, the first terminal group 2210 as well has cables connected thereto and the cables are connected to respective associated ones of external devices. A small-sized controller cable 2311 is connected to the small-sized controller terminal 2211 and a multi-pin video cable 2312 is connected to the multi-pin video terminal 2212. A microphone cable 2313 is connected to the microphone terminal 2213 and a headphone cable 2314 is connected to the headphone terminal 2214. Note that in FIG. 6A, plugs at the other ends of the cables and the external devices to which the cables are connected are omitted from illustration for convenience sake.

Figure 7:
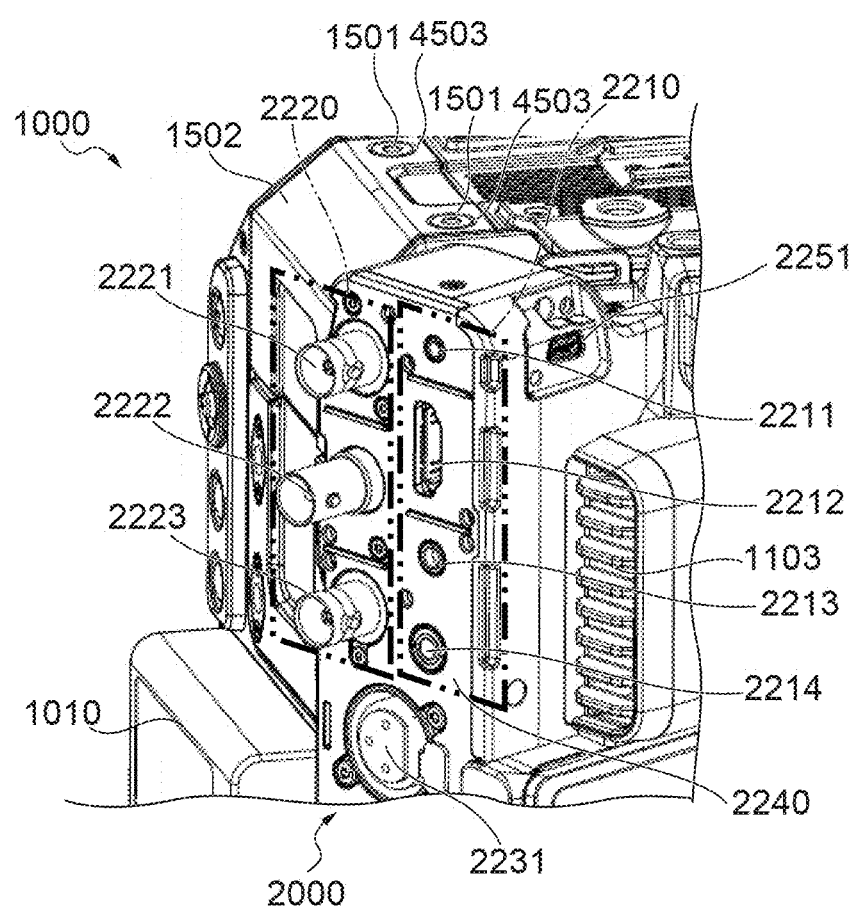
FIG. 7 is an enlarged perspective view of connection terminals in a first column and connection terminals in a second column and their surroundings in a state in which the expansion module is not attached to the image capturing apparatus body.

Referring to FIG. 7, the first terminal group 2210 and the second terminal group 2220 are arranged in two parallel columns. In a case where the expansion module 4500 is not attached to the image capturing apparatus body 1000, the cables can be inserted into and removed from the first terminal group 2210 and the second terminal group 2220 without any trouble.

However, in the state in which the expansion module 4500 is attached to the image capturing apparatus body 1000, a side surface 4501 of the expansion module 4500 is close to the second terminal group 2220 which is a terminal column close to the optical axis. With this, there is a fear that the side surface 4501 of the expansion module 4500 degrades the insertability and removability of the cables attached to the second terminal group 2220, which is the terminal column close to the expansion module 4500 and is on a side toward the optical axis.

To solve this problem, in the present embodiment, as shown in FIG. 7, the second terminal group 2220, which is a terminal group of protruding BNC connectors, is disposed toward the expansion module 4500 (on a side toward the optical axis). On the other hand, the first terminal group 2210, which is a terminal group of recessed terminals having recessed portions into which plugs are inserted, is disposed outward of the second terminal group 2220 (on a side away from the optical axis).

More specifically, as shown in FIG. 7, the first terminal group 2210 is disposed such that the amount of protrusion of the terminals thereof from the connection terminal arrangement surface 2240 is lower than the amount of protrusion of the monitor terminal 2221 and the time code terminal 2223 from the connection terminal arrangement surface 2240. That is, the first terminal group 2210 is formed by so-called recessed terminals, and the second terminal group 2220 is formed by so-called protruding terminals. Therefore, the amount of protrusion of the terminals of the first terminal group, which are distant from the optical axis, from the connection terminal arrangement surface 2240, is smaller than the amount of protrusion of the terminals of the second terminal group, which are close to the optical axis, from the connection terminal arrangement surface 2240. This prevents degradation of the insertability and removability of the cables into and from the terminals of the second terminal group, which are close to the side surface 4501 of the expansion module 4500, thereby making it possible to ensure excellent operability.

Hereinafter, the insertability and removability of the cables into and from the terminals of the second terminal group will be described with reference to FIG. 6B. Operating portions of the BNC cables 2321 inserted into the BNC connectors (terminals of the second terminal group), which are protruding terminals, are BNC cable operating portions 2321(*a*). Since the BNC connectors are protruding connectors, the BNC cable operating portions 2321(*a*) are naturally positioned at respective locations relatively distant from the connection terminal arrangement surface 2240. Further, operating portions of the cables inserted into the recessed terminals (terminals of the first terminal group) are a small-sized controller cable operating portion 2311(*a*), a multi-pin video cable operating portion 2312(*a*), a microphone cable operating portion 2313(*a*), and a headphone cable operating portion 2314(*a*), respectively. As is clear from FIG. 6B, the BNC cable operating portions 2321(*a*) are positioned at locations more distant from the connection terminal arrangement surface 2240 than the small-sized controller cable operating portion 2311(*a*), the multi-pin video cable operating portion 2312(*a*), and so forth. Therefore, although the second terminal group 2220 is close to the side surface 4501 of the expansion module 4500 and is located between the side surface 4501 and the first terminal group 2210 into which the small-sized controller cable 2311 and so forth are inserted, the operability of the second terminal group 2220 is not impaired.

Further, as shown in FIG. 7, since the image capturing apparatus body 1000 has a large number of terminals arranged thereon, a USB terminal 2251 is arranged on a surface which is at right angles to the connection terminal arrangement surface 2240. The USB terminal 2251 is a terminal to be connected to an external device via a USB cable, for communication therewith. The USB terminal 2251 is attached at a location above the air outlet port 1103 such that it will not become an obstacle to exhaust air from the air outlet port 1103 when the USB cable is attached to the USB terminal 2251.

Next, internal structures of the terminals of the first terminal group 2210 and the second terminal group 2220, and the USB terminal 2251 will be described in detail with reference to FIGS. 8A to 9B.

Figure 8A:
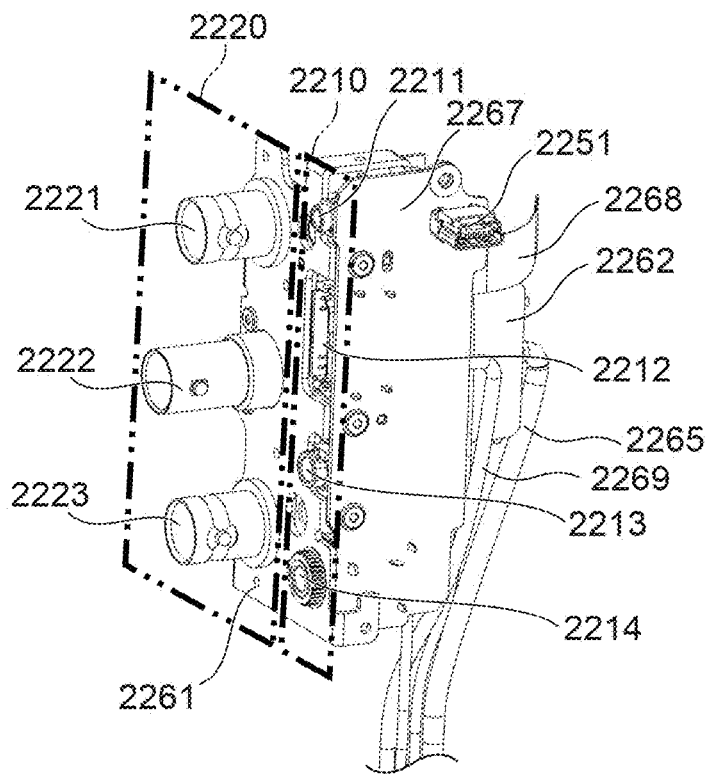
FIGS. 8A and 8B are perspective views of internal structures of the connection terminals in the first column, the connection terminals in the second column, and a USB terminal.
Figure 8B:
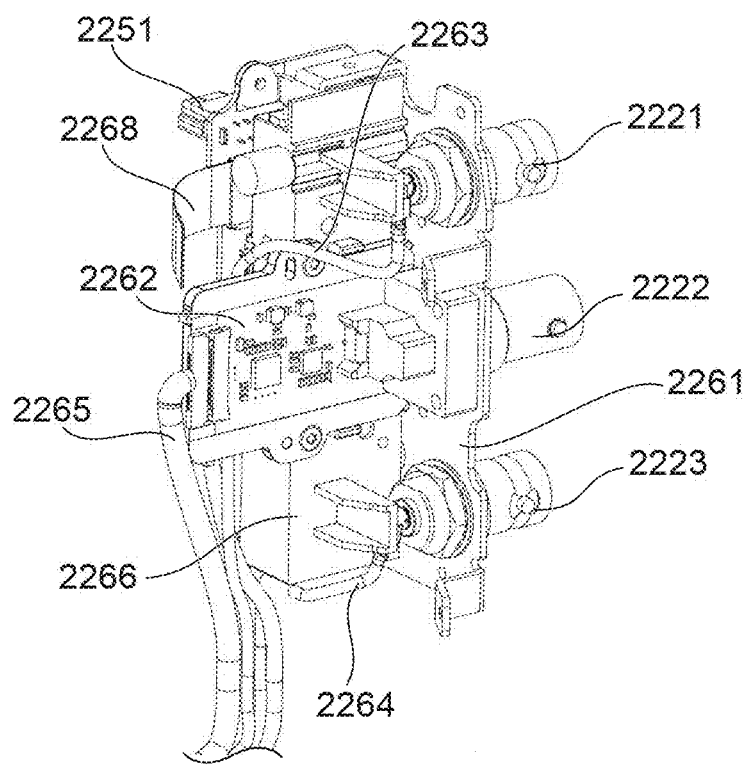
Figure 9A:
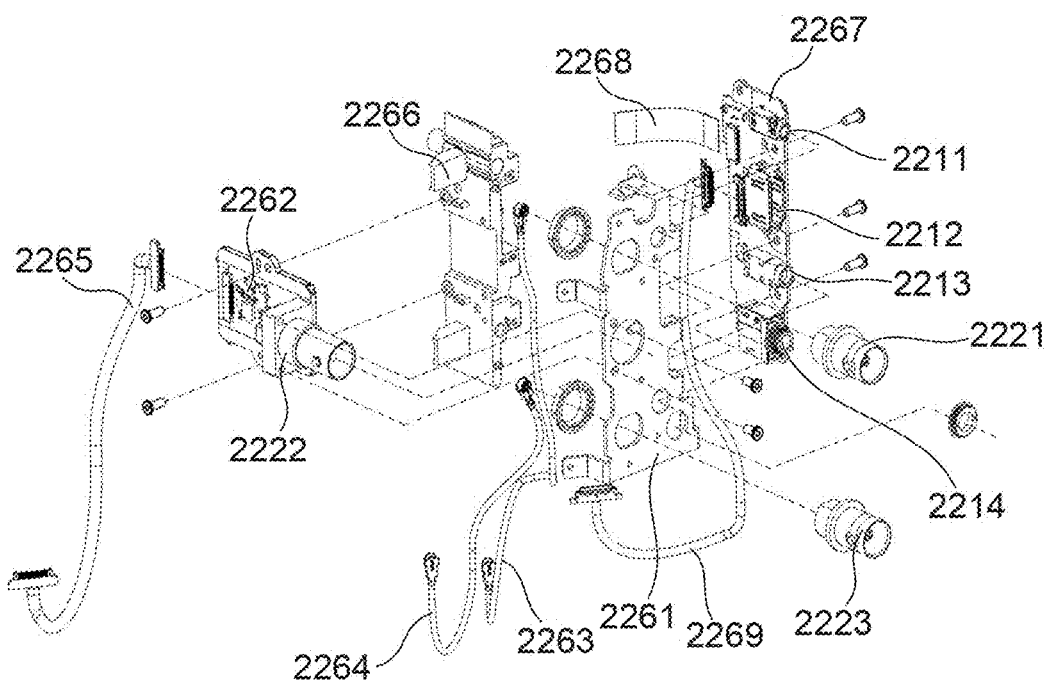
FIGS. 9A and 9B are exploded perspective views of the internal structures of the connection terminals shown in FIGS. 8A and 8B.
Figure 9B:
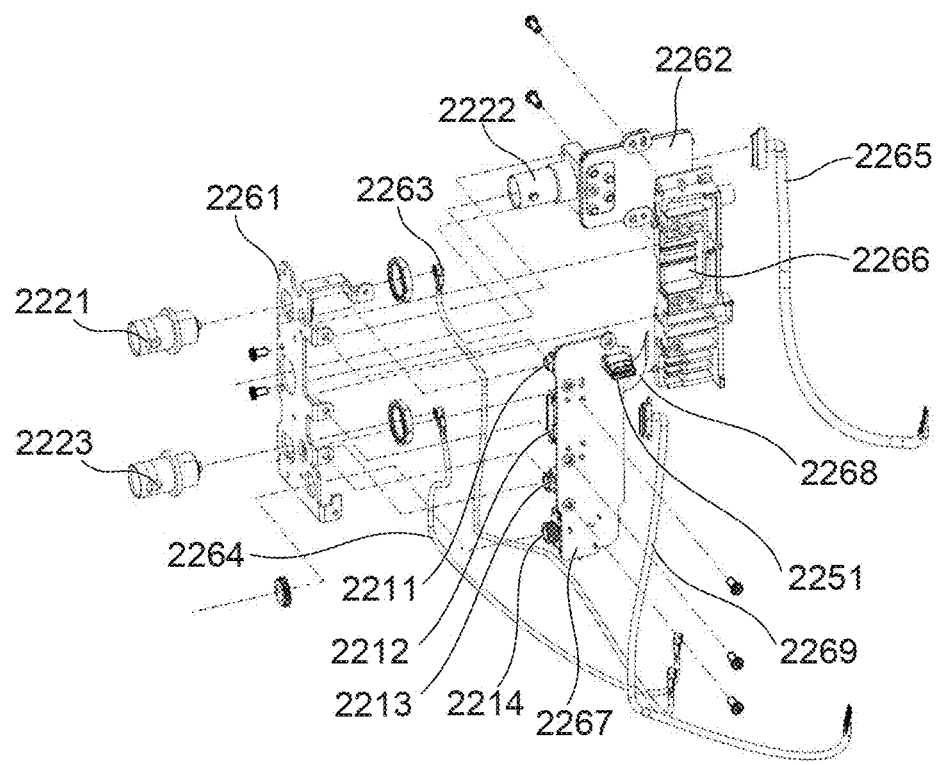

FIGS. 8A and 8B are perspective views of the internal structures of the terminals of the first terminal group 2210 and the second terminal group 2220, and the USB terminal 2251. FIG. 8A is a perspective view of the internal structures of the terminals, as viewed from the left. FIG. 8B is a perspective view of the internal structures of the terminals, as viewed from the right. Further, FIGS. 9A and 9B are exploded perspective views of the internal structures of the terminals in FIGS. 8A and 8B. FIG. 9A is an exploded perspective view of the internal structures of the terminals in FIGS. 8A and 8B, as viewed from the right, and FIG. 9B is an exploded perspective view of the internal structures of the terminals in FIGS. 8A and 8B, as viewed from the left.

As shown in FIGS. 8B and 9A, the monitor terminal 2221 and the time code terminal 2223, which are BNC connectors, are fixed to a terminal fixing sheet metal 2261 by nut tightening. A monitor wire 2263 and a time code wire 2264 are directly connected to the monitor terminal 2221 and the time code terminal 2223, respectively. Since the monitor terminal 2221 and the time code terminal 2223 are attached to the monitor wire 2263 and the time code wire 2264, respectively, it is possible to output internal signals of the image capturing apparatus body 1000 via the monitor terminal 2221 and the time code terminal 2223.

Although similar to the monitor terminal 2221 and the time code terminal 2223, the 12G-SDI terminal 2222 is a BNC connector, the 12G-SDI terminal 2222 is a terminal for sending high-speed signals. Therefore, the 12G-SDI terminal 2222 is mounted on a 12G-SDI circuit board 2262. Further, a 12G-SDI wire 2265 is attached to the 12G-SDI circuit board 2262. Electrical signals sent from the inside of the image capturing apparatus body 1000 via the 12G-SDI wire 2265 are converted to electrical signals capable of withstanding long-distance high-speed transmission by the 12G-SDI circuit board 2262. The signals converted by the 12G-SDI circuit board 2262 are transmitted to an external device from the 12G-SDI terminal 2222. Thus, the 12G-SDI terminal 2222 is mounted on the 12G-SDI circuit board 2262 in order to perform signal conversion for high-speed transmission. The 12G-SDI circuit board 2262 having the 12G-SDI terminal 2222 mounted thereon is fastened to a terminal fixing holder 2266 with two screws. Further, the 12G-SDI terminal 2222 having the terminal fixing holder 2266 and the 12G-SDI circuit board 2262 attached thereto is fastened to the terminal fixing sheet metal 2261 with two screws.

The small-sized controller terminal 2211, the multi-pin video terminal 2212, the microphone terminal 2213, and the headphone terminal 2214 of the first terminal group 2210 are mounted on the same terminal arrangement surface of a terminal board 2267. The USB terminal 2251 is mounted on a surface of the terminal board 2267 opposite to the terminal arrangement surface. The small-sized controller terminal 2211, the multi-pin video terminal 2212, the microphone terminal 2213, the headphone terminal 2214, and the USB terminal 2251 are all mounted on the terminal board 2267 without using separate circuit boards, whereby size reduction of the image capturing apparatus body 1000 is realized. The terminal board 2267 is electrically connected to the inside of the image capturing apparatus body 1000 by a terminal board FFC 2268 and terminal board wires 2269. This makes it possible to input or output signals to or from the inside of the image capturing apparatus body 1000 via the small-sized controller terminal 2211, the multi-pin video terminal 2212, the microphone terminal 2213, the headphone terminal 2214, and the USB terminal 2251. The terminal board 2267 is fastened to the terminal fixing holder 2266 together with the terminal fixing sheet metal 2261 with three screws. The internal structures of the terminals of the first terminal group 2210, the second terminal group 2220, and the USB terminal 2251 are configured as described hereinabove.

Incidentally, it is desired that the image capturing apparatus body 1000 is compact in size. Hereinafter, the construction of the second terminal group 2220, which is a triple BNC connector largely contributing to the size reduction of the image capturing apparatus body 1000, will be described in detail with reference to FIGS. 10A to 10C.

Figure 10A:
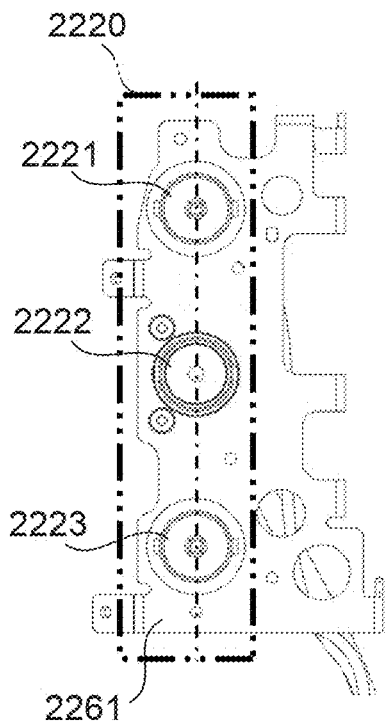
FIGS. 10A to 10C are views of the internal construction of the connection terminals in the second column.
Figure 10B:
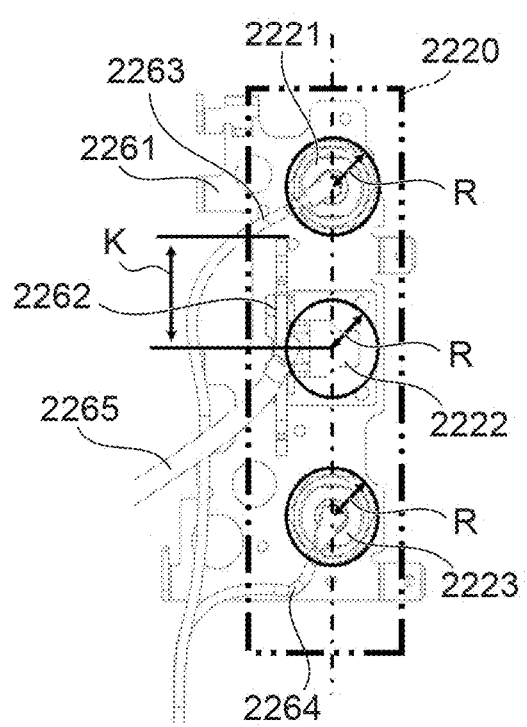
Figure 10C:
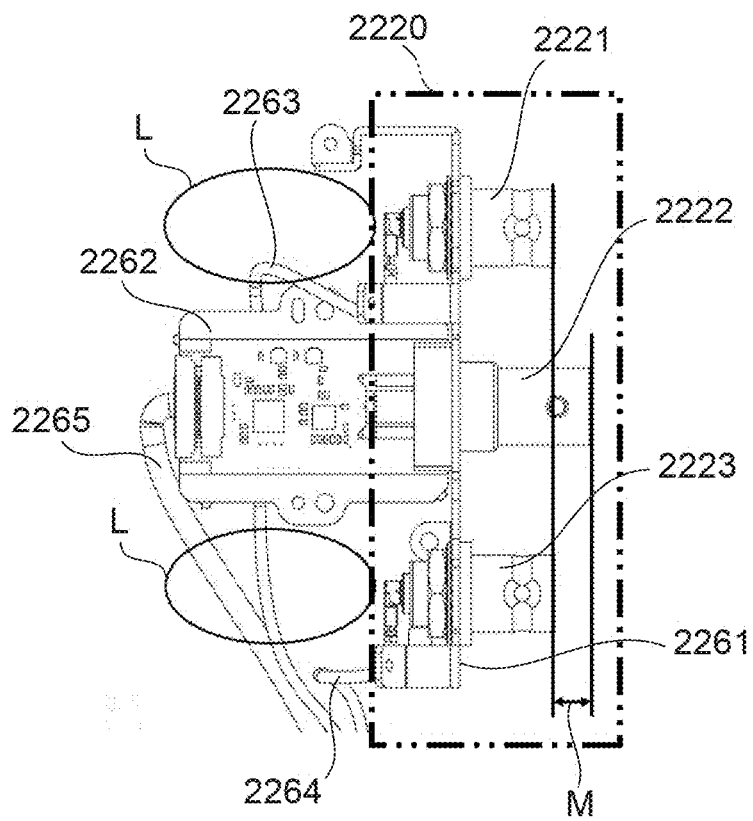

FIGS. 10A to 10C are views of the internal construction of the terminals of the second terminal group 2220, which show a state in which the 12G-SDI circuit board 2262 having the 12G-SDI terminal 2222 mounted thereon, the monitor terminal 2221, and the time code terminal 2223 are attached to the terminal fixing sheet metal 2261. FIG. 10A is a view of the internal construction of the second terminal group 2220, as viewed from the rear. FIG. 10B is a view of the same, as viewed from the front. FIG. 10C is a view of the same, as viewed from the right.

As shown in FIG. 10A, in the second terminal group 2220, to reduce the size thereof, the monitor terminal 2221, the 12G-SDI terminal 2222, and the time code terminal 2223 are arranged in one straight line in the mentioned order. The reason for this will be described as follows:

As described hereinabove, the 12G-SDI terminal 2222 is mounted on the 12G-SDI circuit board 2262, for transmission of high-speed signals. On the other hand, compared with the 12G-SDI terminal 2222, the monitor terminal 2221 and the time code terminal 2223, which are low-speed signal terminals, are directly connected to the monitor wire 2263 and the time code wire 2264, respectively, without being mounted on the circuit board. To dispose the 12G-SDI circuit board 2262, a distance K in the direction of arrangement of the terminals 2221, 2222, and 2223 is required to be secured therefor, which is a distance from the center of the axis of the 12G-SDI terminal 2222 to one end of the 12G-SDI circuit board 2262. On the other hand, to dispose the monitor terminal 2221 and the time code terminal 2223 which are not mounted on the 12G-SDI circuit board 2262, a radius R is required to be secured therefor, which is the radius of a circle of each terminal. Unless a circuit board has a size exceeding a twofold of the radius R of a terminal, it is impossible to mount the terminal thereon, and hence the distance K is larger than the radius R. Further, the 12G-SDI circuit board 2262 is disposed such that it extends to a point which is almost in contact with a point where the radius R of the 12G-SDI terminal 2222 reaches, and is parallel to (the direction of) the arrangement of the BNC connectors. The term "parallel", mentioned here, refers to a concept that means not "strictly geometrically parallel" but "practically parallel" including "approximately parallel". For this reason, the 12G-SDI circuit board 2262 is configured to be disposed in a space which is not occupied by the radii R of the monitor terminal 2221 and the time code terminal 2223. This configuration realizes the size reduction of the image capturing apparatus body 1000.

Assuming that the BNC connectors are arranged in the order of the 12G-SDI terminal 2222, the monitor terminal 2221, and the time code terminal 2223, the size of the second terminal group 2220 is increased due to the distance K which is required to be secured from the center of the axis of the 12G-SDI terminal 2222 to one end of the 12G-SDI circuit board 2262. To solve this problem, as described above, the monitor terminal 2221 and the time code terminal 2223, which are not mounted on the 12G-SDI circuit board 2262, are disposed on opposite sides of the 12G-SDI terminal 2222 which is mounted on the 12G-SDI circuit board such that the 12G-SDI terminal 2222 is sandwiched therebetween. This realizes reduction of the space for arranging the second terminal group 2220.

Further, the 12G-SDI circuit board 2262 is liable to generate electromagnetic noise because it performs conversion of high-speed signals. However, as shown in FIG. 10C, a space L is formed at each of the monitor terminal 2221 and the time code terminal 2223 by the above-described arrangement. This makes it difficult to propagate the electromagnetic noise from the 12G-SDI circuit board 2262 to the outside of the image capturing apparatus body 1000 or other circuit boards inside the image capturing apparatus body 1000.

Further, as shown in FIGS. 6A and 6B, referred to hereinabove, in the state in which the expansion module 4500 is attached to the image capturing apparatus body 1000, the second terminal group 2220 is sandwiched between the first terminal group 2210 and the side surface 4501 of the expansion module 4500. Further, among the terminals of the second terminal group 2220, the 12G-SDI terminal 2222 is configured to be sandwiched between the monitor terminal 2221 and the time code terminal 2223. The 12G-SDI terminal 2222 is frequently used since it is an output terminal for outputting developed high-speed 4K60P videos or undeveloped raw 4K60P video signals. Because of being frequently used, the 12G-SDI terminal 2222 is provided, as shown in FIG. 10C, such that it protrudes more than the monitor terminal 2221 and the time code terminal 2223 by a distance M. More specifically, the connection terminal which is mounted on the circuit board has a larger amount of protrusion from the connection terminal arrangement surface than the connection terminal which are not mounted on the circuit board. Therefore, although the 12G-SDI terminal 2222 is sandwiched between the first terminal group 2210 and the side surface 4501 and is further sandwiched between the monitor terminal 2221 and the time code terminal 2223, the user-friendliness of the 12G-SDI terminal 2222 is not impaired.

As described heretofore, the second terminal group 2220, which is a triple BNC connector, is arranged such that the size reduction thereof can be realized, and also is configured to be excellent in improving user-friendliness and coping with electromagnetic noise.

Next, a description is given of a protection cover group 4200 for protecting the terminals of the rear input/output terminal group 2000. The protection cover group 4200 is attached to the rear input/output terminal group 2000 shown in FIG. 1B such that covers thereof can be closed and opened in order to prevent dust from being mixed into the terminals and prevent breakage of the terminals.

Figure 11:
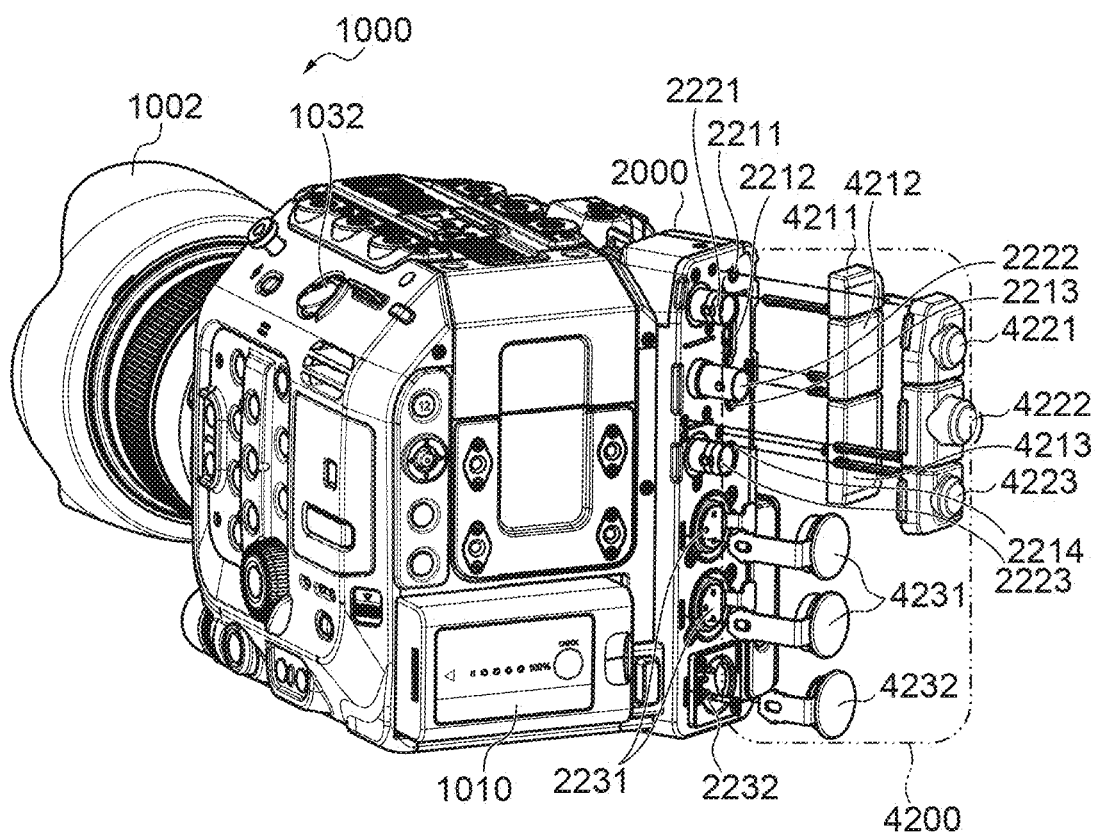
FIG. 11 is a perspective view useful in explaining an arrangement for attaching a protection cover group to connection terminals.

FIG. 11 is a perspective view useful in explaining the arrangement for attaching the protection cover group to the connection terminals. Further, FIG. 12 is a perspective view of the image capturing apparatus body 1000 in a state in which the protection cover group is attached to the connection terminals.

FIG. 11 shows the protection cover group 4200 associated with the rear input/output terminal group 2000. The protection cover group 4200 is comprised of first to third protection cover groups 4210, 4220, and 4230 which are associated with the above-described first to third terminal groups, respectively. The first protection cover group 4210 includes a small-sized controller terminal cover 4211, a multi-pin video terminal cover 4212, and a microphone/headphone terminal cover 4213. Further, the second protection cover group 4220 includes a monitor terminal cover 4221, a 12G-SDI terminal cover 4222, and a time code terminal cover 4223. The third protection cover group 4230 includes large-sized microphone terminal covers 4231 and a power input terminal cover 4232.

Figure 12:
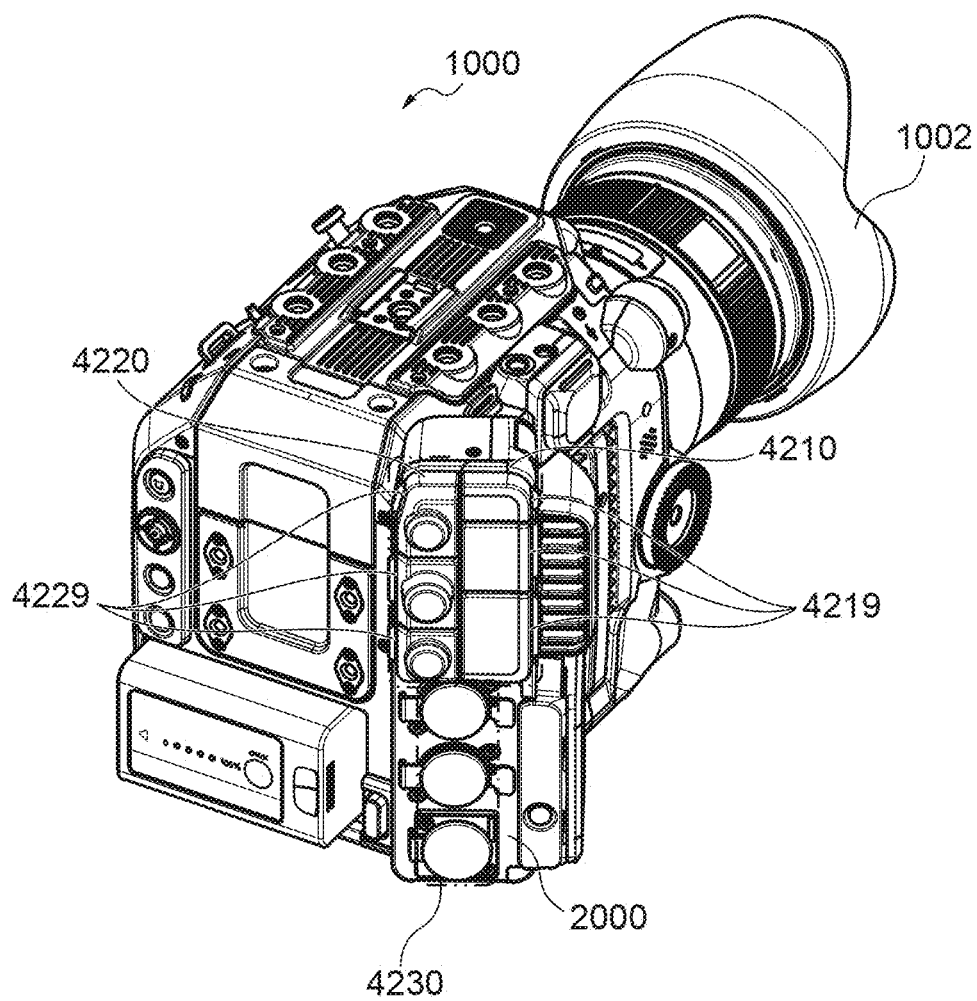
FIG. 12 is a perspective view of the image capturing apparatus body in a state in which the protection cover group is attached to the connection terminals.
Figure 14:
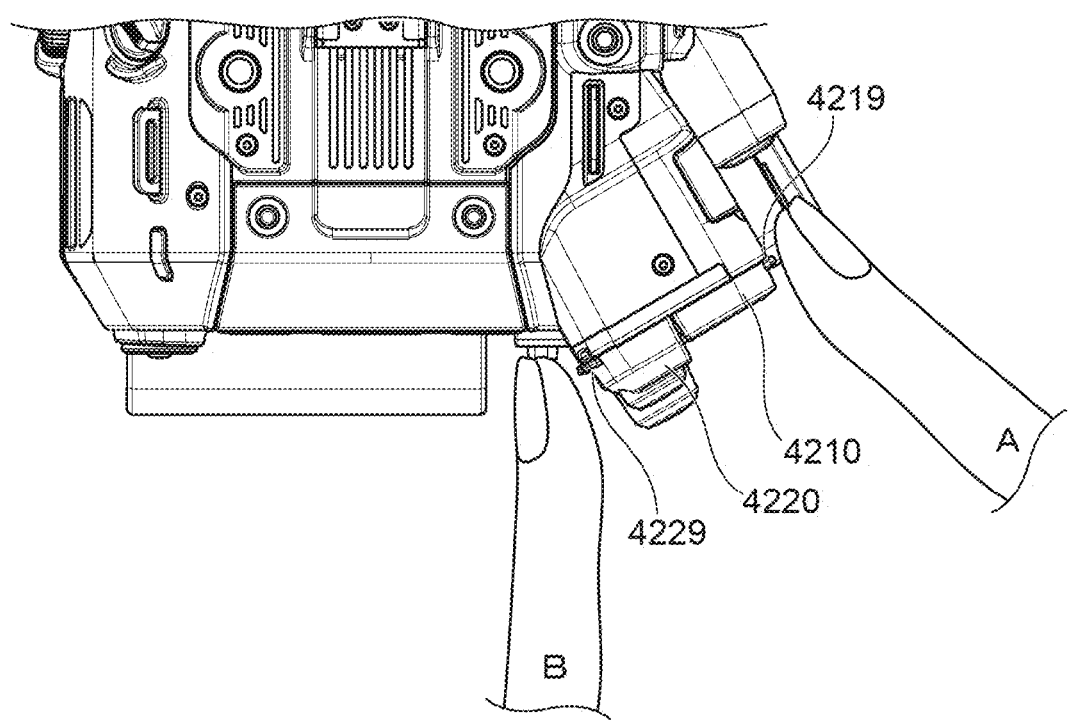
FIG. 14 is a partial plan view of the image capturing apparatus body without the expansion module attached thereto.

As shown in FIGS. 12 and 14, for opening the protection covers thereof, the first protection cover group 4210 has first finger hooking portions 4219 provided on a surface opposite to a surface where second finger hooking portions 4229 are provided for opening the protection covers of the second protection cover group 4220 adjacent to the first protection cover group 4210.

Figure 13A:
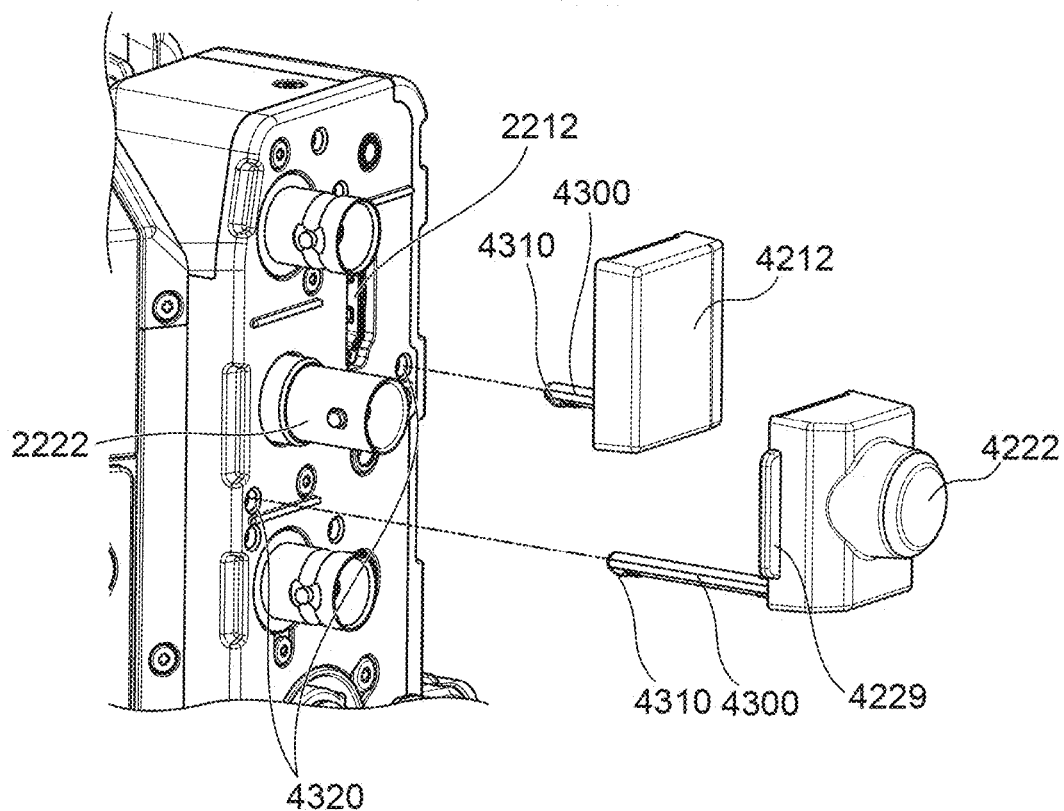
FIGS. 13A and 13B are views useful in explaining a method of attaching protection covers.
Figure 13B:
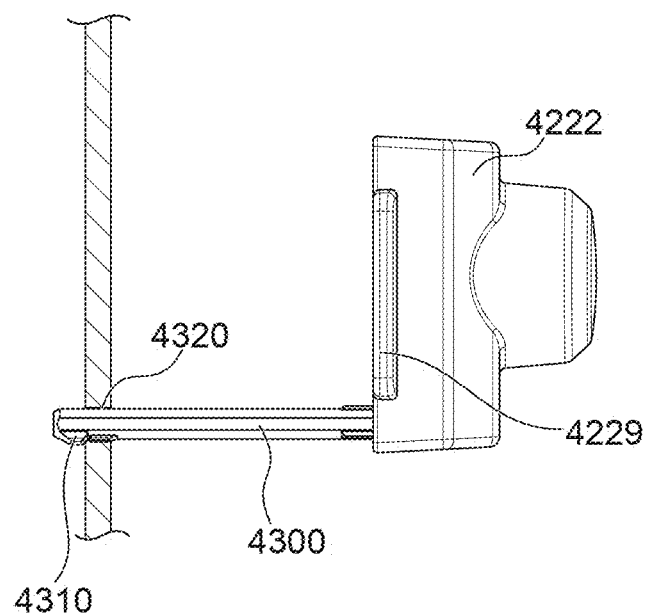

FIGS. 13A and 13B are views useful in explaining a method of attaching the protection covers. Referring to FIGS. 13A and 13B, the multi-pin video terminal cover 4212 of the first protection cover group 4210 and the 12G-SDI terminal cover 4222 of the second protection cover group 4220 are attached to respective associated ones of the terminals of the first terminal group 2210 and the second terminal group 2220 by being pressed thereagainst.

The shapes of the protection covers included in the first protection cover group 4210 and the second protection cover group 4220, respectively, are approximately the same. Therefore, hereinafter, the shapes of the protection covers of the first protection cover group 4210 and the second protection cover group 4220 will be described, based on the multi-pin video terminal cover 4212 and the 12G-SDI terminal cover 4222, taken as examples, for convenience sake.

As shown in FIG. 13A, the multi-pin video terminal cover 4212 and the 12G-SDI terminal cover 4222 include hinge portions 4300 which connect the terminal covers 4212 and 4222 to the image capturing apparatus body 1000 when the terminal covers are removed from the image capturing apparatus body 1000. Tip end convex portions 4310 are formed on respective tip ends of the respective hinge portions 4300. Further, as shown in FIG. 13B, the hinge portion is configured such that by force-fitting the tip end including the tip end convex portion 4310 into a through hole 4320 formed in the vicinity of each input/output terminal, the tip end convex portion 4310 is caught by an inner wall of the insertion hole 4320, whereby the protection cover is held instead of falling off when it is opened.

FIG. 14 is a partial plan view of the image capturing apparatus body 1000 without the expansion module 4500 attached thereto. In FIG. 14, symbols A and B indicate fingers of the user. The user can open the first protection cover group 4210 by putting the finger A on the first finger hooking portion 4219. Further, the user can open the second protection cover group 4220 by putting the finger B on the second finger hooking portion 4229.

Figure 15:
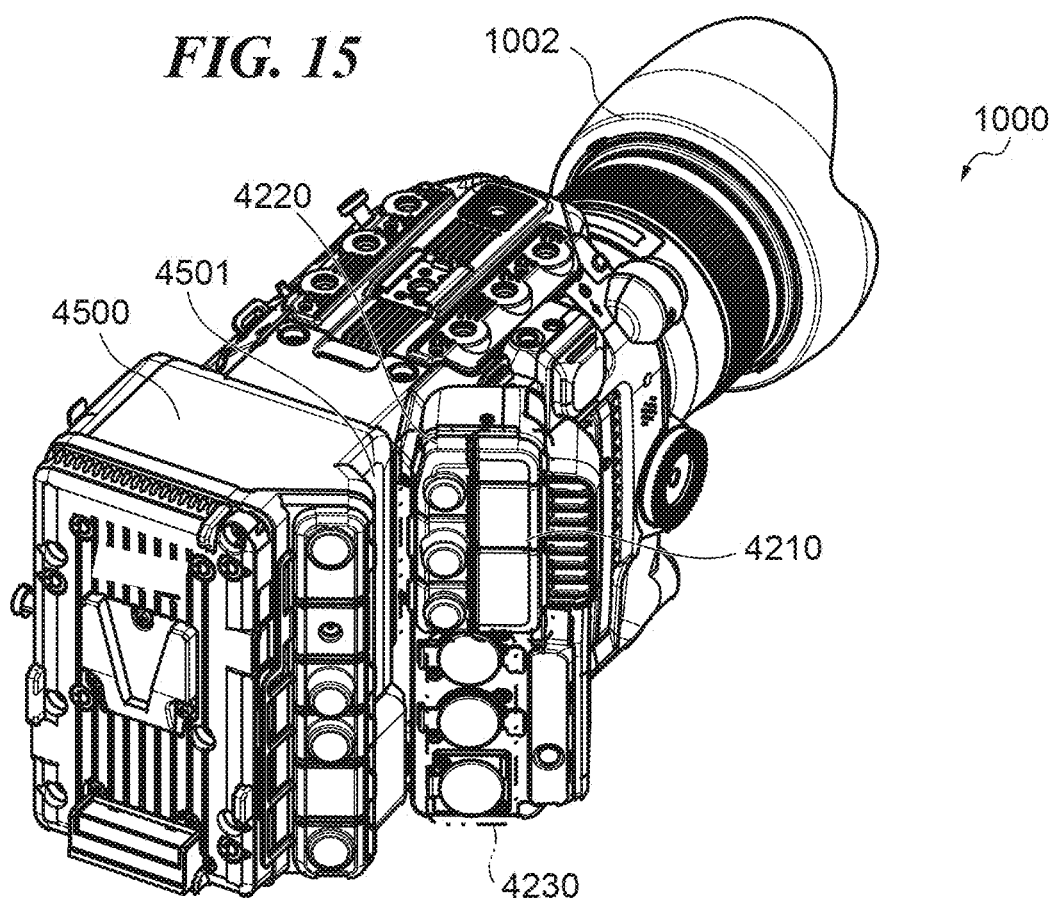
FIG. 15 is a perspective view of the image capturing apparatus body with the expansion module attached thereto, as viewed from the rear.
Figure 16:
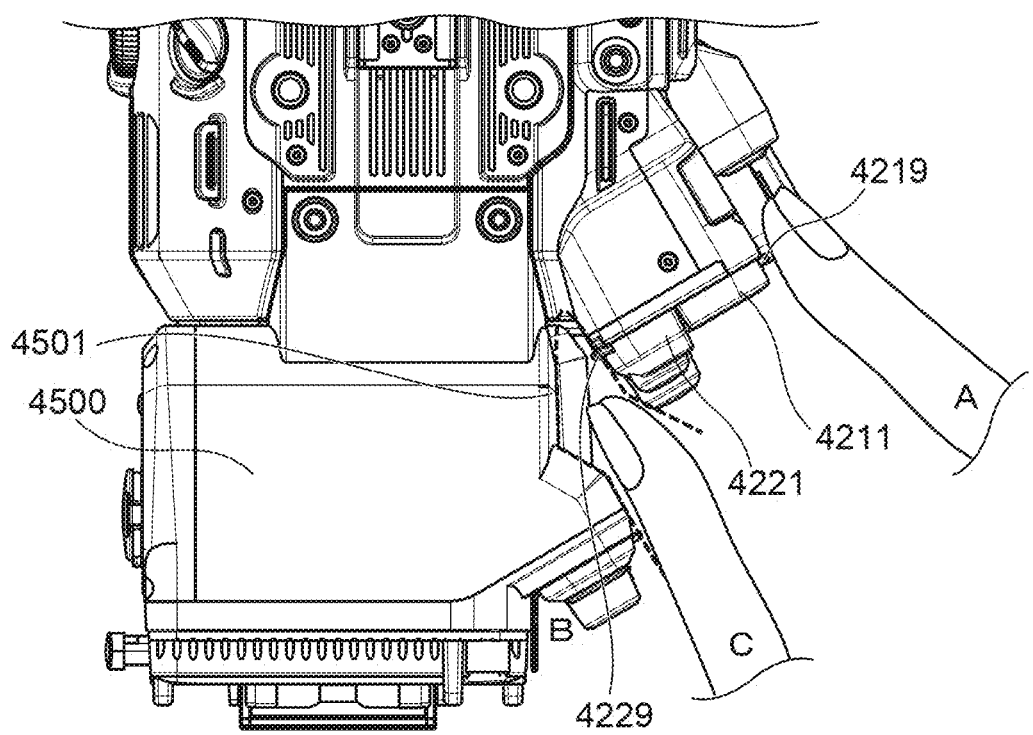
FIG. 16 is a partial plan view of the image capturing apparatus body with the expansion module attached thereto.

FIG. 15 is a perspective view of the image capturing apparatus body 1000 with the expansion module 4500 attached thereto, as viewed from the rear. FIG. 16 is a partial plan view of the image capturing apparatus body 1000 with the expansion module 4500 attached thereto.

As shown in FIGS. 15 and 16, the side surface 4501 of the expansion module 4500 is close (adjacent) to the second finger hooking portions 4229 of the second protection cover group 4220. This reduces a gap between each second finger hooking portion 4229 and the side surface 4501 of the expansion module 4500, so that a finger, indicated by a symbol C, of the user sometimes cannot reach or be put on the second finger hooking portion 4229.

Figure 17A:
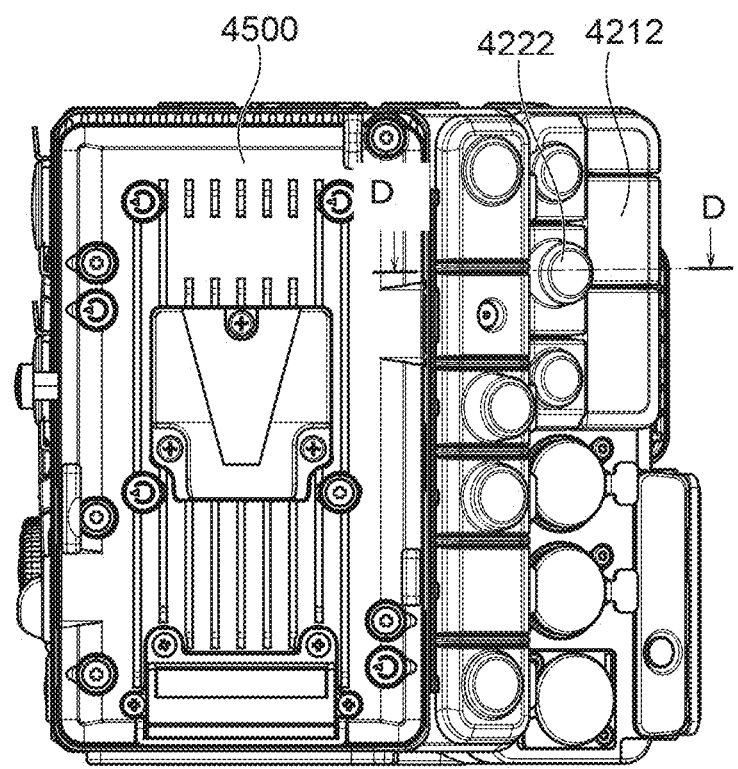
FIGS. 17A and 17B are a rear view and a cross-sectional view of the image capturing apparatus body with the expansion module attached thereto.
Figure 17B:
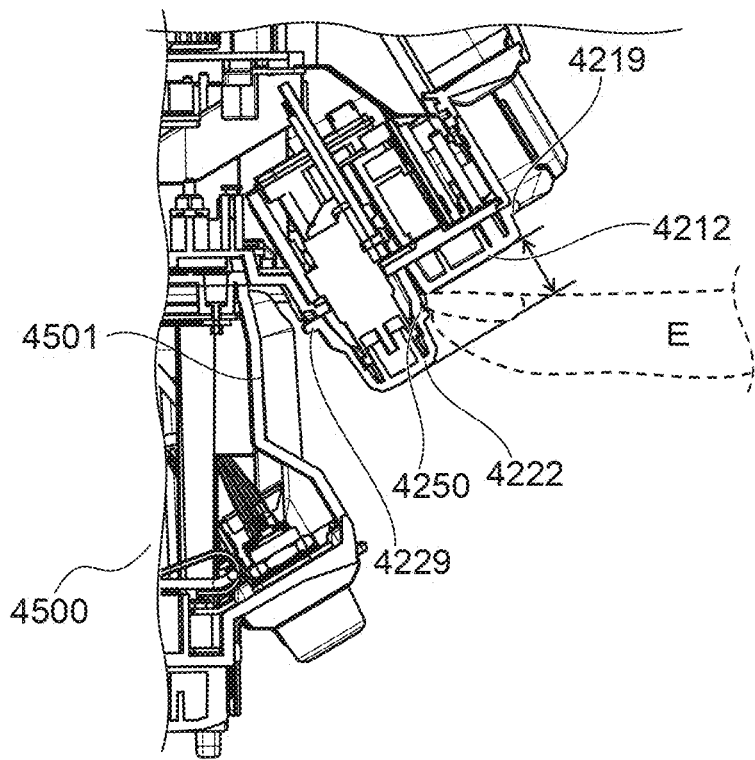

FIGS. 17A and 17B are a rear view and a cross-sectional view of the image capturing apparatus body 1000 with the expansion module 4500 attached thereto. FIG. 17B shows a cross-section taken along D-D in FIG. 17A.

It is possible to confirm cross-sectional shapes of the multi-pin video terminal cover 4212 and the 12G-SDI terminal cover 4222 from FIG. 17B. First, the multi-pin video terminal cover 4212 and the 12G-SDI terminal cover 4222 are different in height in an input/output terminal insertion direction, and the 12G-SDI terminal cover 4222 is higher than the multi-pin video terminal cover 4212. Further, the 12G-SDI terminal cover 4222 has a third finger hooking portion 4250 having a recessed shape and formed on a side surface adjacent to the multi-pin video terminal cover 4212. The third finger hooking portion 4250 is configured such that it has a positional relationship with its surrounding, in which the third finger hooking portion 4250 is exposed from the protection cover of the first protection cover group 4210 (the multi-pin video terminal cover 4212), when the image capturing apparatus body 1000 is viewed from the side, even in a state in which the multi-pin video terminal cover 4212 is attached to the multi-pin video terminal 2212.

Therefore, also in a state in which the multi-pin video terminal cover 4212 and the 12G-SDI terminal cover 4222 are attached to the associated input/output terminals, the user can put a finger, indicated by a symbol E, on the third finger hooking portion 4250 of the 12G-SDI terminal cover 4222 from toward the multi-pin video terminal cover 4212 which is lower in height than the 12G-SDI terminal cover 4222. That is, it is possible to open the 12G-SDI terminal cover 4222.

As mentioned above, the other protection covers of the first protection cover group 4210 have approximately the same configuration as that of the multi-pin video terminal cover 4212 and the other protection covers of the second protection cover group 4220 have approximately the same configuration as that of the 12G-SDI terminal cover 4222. That is, the monitor terminal cover 4221 and the time code terminal cover 4223 of the second protection cover group 4220 are each provided with the third finger hooking portion 4250, and hence it is possible to open the covers by finger hooking.

As described hereinabove, in the image capturing apparatus according to the present embodiment, in which the first protection cover group 4210 and the second protection cover group 4220 are juxtaposed in two columns, the third finger hooking portions 4250, which are recessed portions, are formed on the surface of the second protection cover group 4220, adjacent to the first protection cover group 4210. With this, even in in the state in which the expansion module 4500 is attached to the image capturing apparatus body 1000, the user can open the protection covers of the second protection cover group 4220, and hence it is possible to ensure excellent operability of the image capturing apparatus.

Next, a relationship between the air outlet port 1103 and the rear input/output terminal group 2000 will be described with reference to FIGS. 18, 19, and 20.

Figure 18:
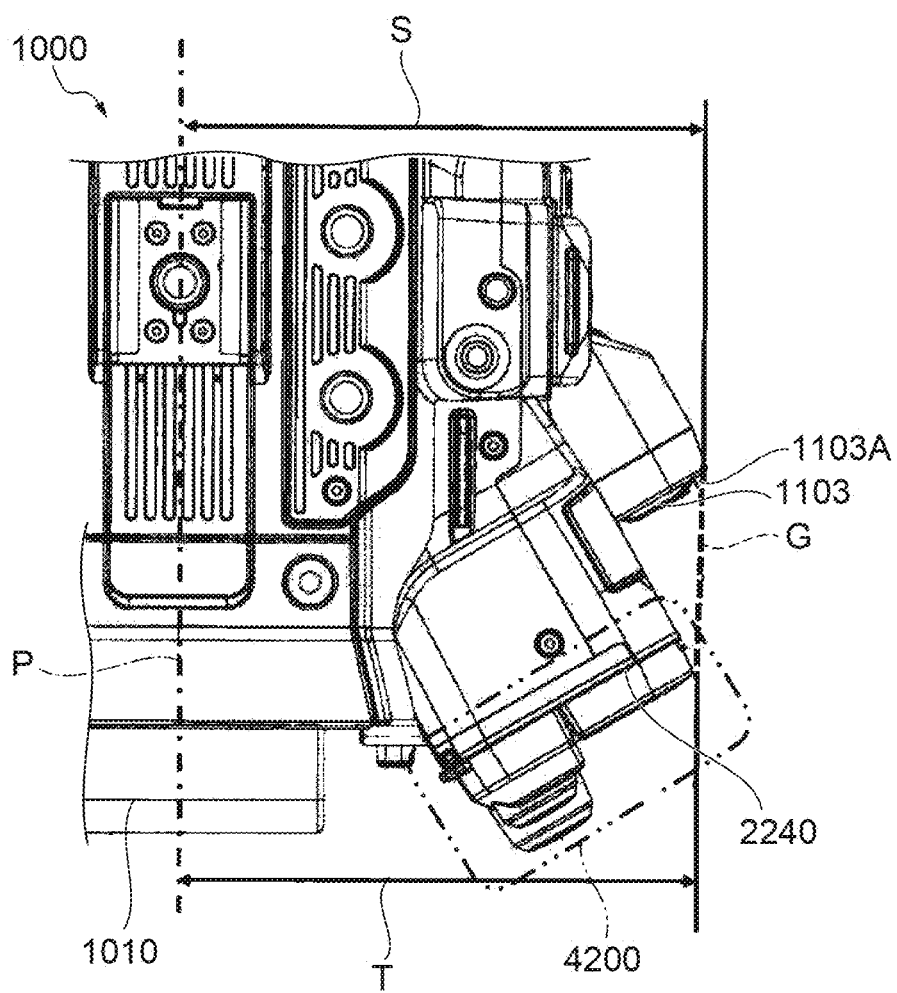
FIG. 18 is a partial plan view of connection terminals and their surroundings of the image capturing apparatus body without the expansion module attached thereto, as viewed from above.

FIG. 18 is a partial plan view of connection terminals and their surroundings of the image capturing apparatus body 1000 without the expansion module 4500 attached thereto, as viewed from above. FIG. 19 is a left side view of the image capturing apparatus body 1000 shown in FIG. 18, and FIG. 20 is a front view of the image capturing apparatus body 1000 shown in FIG. 18.

Referring to FIG. 18, an air outlet port arrangement surface 1103A where the air outlet port 1103 is arranged and the connection terminal arrangement surface 2240 are different from each other, and also the air outlet port arrangement surface 1103A and the connection terminal arrangement surface 2240 are arranged such that they are substantially parallel to each other. The air outlet port arrangement surface 1103A and the connection terminal arrangement surface 2240 are arranged to have predetermined angles with respect to the optical axis P of the image capturing apparatus body 1000 and the plane perpendicular to the optical axis P, respectively. Further, assuming that a distance from the optical axis P of the image capturing apparatus body 1000 to an outermost portion of the air outlet port 1103 is represented by a distance S, and a distance from the optical axis P to an outermost portion of the protection cover group 4200 is represented by a distance T, the distance S and the distance T are approximately equal, as is apparent from FIG. 18. Therefore, a broken line G (virtual straight line), which connects an end of the image capturing apparatus body 1000 in the width direction on the air outlet port arrangement surface 1103A where the air outlet port 1103 is arranged and an end of the image capturing apparatus body

1000 in the width direction on the connection terminal arrangement surface 2240 or the protection cover group 4200, is parallel to the optical axis P. The term "parallel", mentioned here, refers to the concept that means not "strictly geometrically parallel" but "practically parallel" including "approximately parallel".

Figure 19:
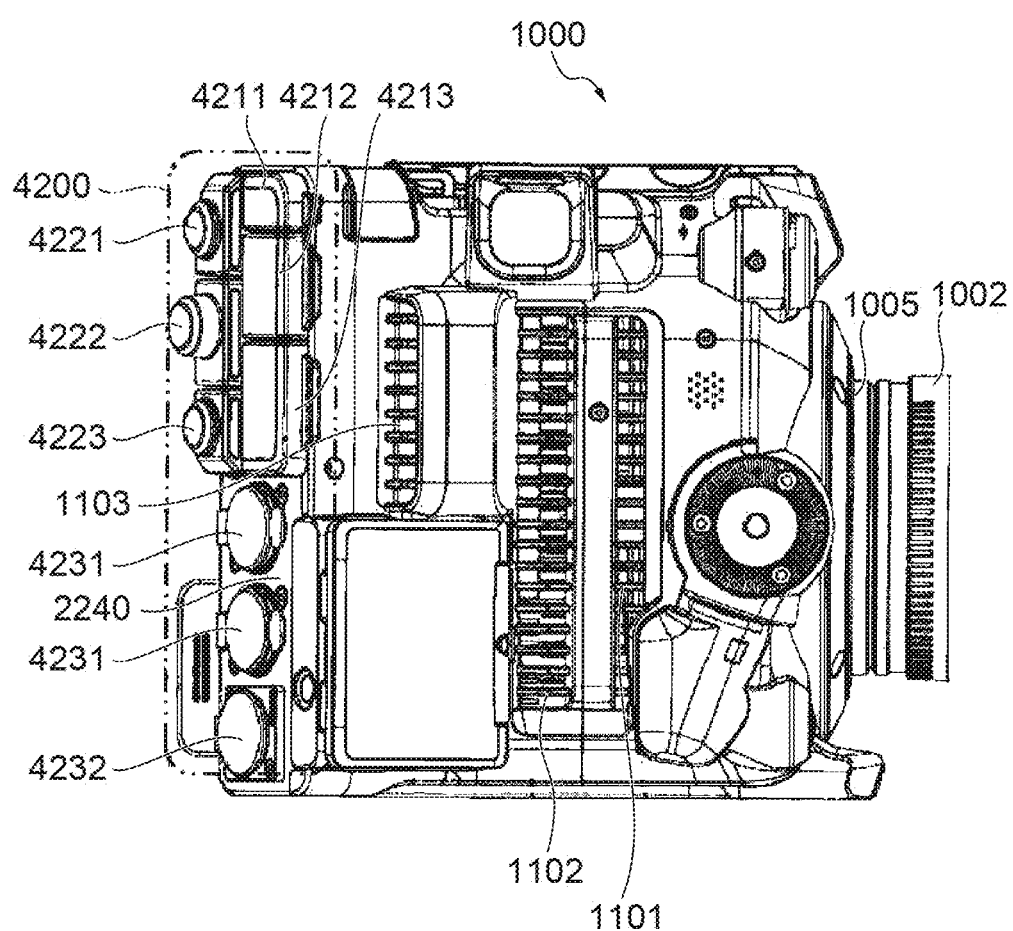
FIG. 19 is a left side view of the image capturing apparatus body shown in FIG. 18.
Figure 20:
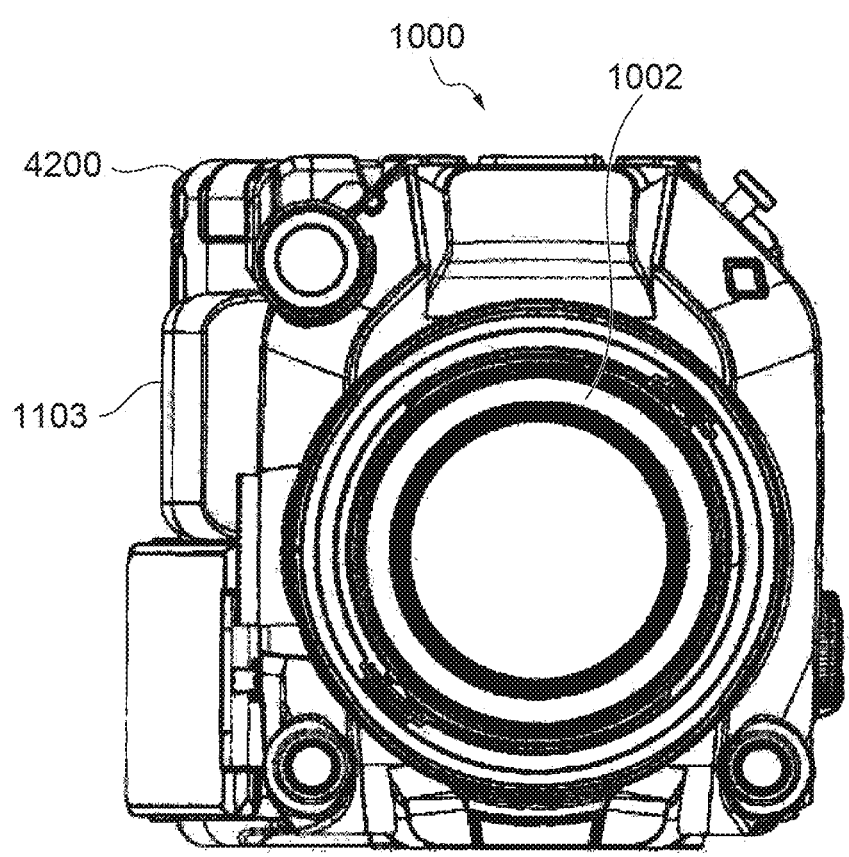
FIG. 20 is a front view of the image capturing apparatus body shown in FIG. 18

As shown in FIG. 19 which is the left side view of the image capturing apparatus body 1000, the air outlet port 1103 and the protection cover group 4200 are arranged at locations displaced in the left-right direction as viewed in FIG. 19 (front-rear direction) such that they do not overlap each other. Further, as shown in FIG. 20 which is the front view of the image capturing apparatus body 1000, the air outlet port 1103 and the protection cover group 4200 are arranged such that they overlap each other. More specifically, the air outlet port arrangement surface 1103A where the air outlet port 1103 is arranged and the connection terminal arrangement surface 2240 where the connection terminals are arranged are provided on different surfaces, and the connection terminal arrangement surface 2240 and the air outlet port arrangement surface 1103A are laterally displaced, as viewed from the side of the image capturing apparatus body 1000. Further, the connection terminal arrangement surface 2240 and the air outlet port arrangement surface 1103A are arranged such that they overlap each other, as viewed from the front of the image capturing apparatus body 1000. At this time, it is desirable that the virtual straight line, which connects the end of the image capturing apparatus body 1000 in the width direction on the air outlet port arrangement surface 1103A and the end of the image capturing apparatus body 1000 in the width direction on the connection terminal arrangement surface 2240, is parallel to the optical axis P.

With this configuration, it is possible to prevent the air outlet port 1103 from being covered in a state in which a wall or the photographer is positioned on the rear side, and also reduce the size of the image capturing apparatus body 1000 in the width direction (x direction).

In the present embodiment, it is desirable that the connection terminal arrangement surface 2240 and the air outlet port arrangement surface 1103A are arranged on the grip-side surface of the image capturing apparatus body 1000. This makes it possible to effectively use all the surfaces of the image capturing apparatus body 1000, thereby making it possible to realize size reduction of the apparatus.

Further, the air outlet port arrangement surface 1103A is arranged at a more forward location of the image capturing apparatus 1001 than the connection terminal arrangement surface. This makes it possible to realize the size reduction of the image capturing apparatus 1001, while ensuring a space into which air is discharged from the air outlet port 1103.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-150315, filed Aug. 20, 2019, which is hereby incorporated by reference herein in its entirety.

What is claimed is:

1. An image capturing apparatus comprising:
   a plurality of connection terminals for connecting external devices thereto;
   an air inlet port via which air is drawn in for cooling heat sources of the image capturing apparatus; and
   an air outlet port via which the air is discharged,
   wherein a connection terminal arrangement surface where the plurality of connection terminals is arranged and an air outlet port arrangement surface where the air outlet port is arranged form respective different surfaces, inclined at predetermined angles with respect to an optical axis, respectively,
   wherein the connection terminal arrangement surface and the air outlet port arrangement surface are arranged to be displaced in a left-right direction, as viewed from a side of the image capturing apparatus, and also are arranged to overlap each other, as viewed from a front of the image capturing apparatus, and
   wherein a virtual straight line, which connects an end of the air outlet port arrangement surface, which is most distant from the optical axis, and an end of the connection terminal arrangement surface, which is most distant from the optical axis, is approximately parallel to the optical axis, as viewed from above the image capturing apparatus.

2. The image capturing apparatus according to claim 1, wherein the connection terminal arrangement surface and the air outlet port arrangement surface are arranged on a grip-side surface of the image capturing apparatus.

3. The image capturing apparatus according to claim 1, wherein the air outlet port arrangement surface is arranged at a more forward location of the image capturing apparatus than the connection terminal arrangement surface.

4. The image capturing apparatus according to claim 1,
   wherein the plurality of connection terminals is arranged in two columns on the connection terminal arrangement surface,
   wherein connection terminals in a second column closer to the optical axis have protruding shapes that protrude from the connection terminal arrangement surface, and
   wherein connection terminals in a first column, which are more distant from the optical axis, have a smaller amount of protrusion from the connection terminal arrangement surface than the connection terminals in the second column.

5. The image capturing apparatus according to claim 4, further comprising an expansion module attachment portion disposed at a location closer to the optical axis than the connection terminal arrangement surface,
   wherein, when an expansion module is attached to the expansion module attachment portion, a side surface of the expansion module is close to the connection terminals in the second column.

6. The image capturing apparatus according to claim 5, further comprising protection covers that protect the connection terminals in the two columns, respectively,
   wherein protection covers that protect the connection terminals in the second column each have a finger-hooking recessed portion formed at an end thereof distant from the side surface of the expansion module.

7. The image capturing apparatus according to claim 6, wherein in a state in which the protection covers are attached to the connection terminals, the finger-hooking recessed portion is formed at a location exposed from protection covers that protect the connection terminals in the first column, as viewed from a side of the image capturing apparatus.

8. The image capturing apparatus according to claim 6, wherein in a state in which the protection covers are attached to the connection terminals, the protection covers that protect the connection terminals in the second column are higher in height than protection covers that protect the connection terminals in the first column.

9. The image capturing apparatus according to claim 5, wherein the expansion module is a module for expanding functions or performances of the image capturing apparatus.

10. The image capturing apparatus according to claim 4,
wherein the connection terminals in the second column are three or more connection terminals arranged in one column, and
wherein at least one of the three or more connection terminals is a connection terminal mounted on a circuit board, and connection terminals arranged on opposite sides of the connection terminal mounted on the circuit board are each a connection terminal that is not mounted on a circuit board.

11. The image capturing apparatus according to claim 10, wherein the circuit board is arranged to be approximately parallel to a direction of arrangement of the three or more connection terminals arranged in the one column.

12. The image capturing apparatus according to claim 10, wherein the connection terminal mounted on the circuit board has a larger amount of protrusion from the connection terminal arrangement surface than the connection terminals that are not mounted on the circuit board.

13. The image capturing apparatus according to claim 10, wherein plugs having the same shape are connected to the three or more connection terminals, respectively.

14. The image capturing apparatus according to claim 10, wherein the connection terminal mounted on the circuit board is a terminal for transmitting high-speed signals.

* * * * *